(12) United States Patent
Borovsky et al.

(10) Patent No.: US 10,430,797 B1
(45) Date of Patent: *Oct. 1, 2019

(54) PROXY CARD PAYMENT WITH DIGITAL RECEIPT DELIVERY

(71) Applicant: Square, Inc., San Francisco, CA (US)

(72) Inventors: Andrew Borovsky, New York, NY (US); Paul Aaron, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 15/339,794

(22) Filed: Oct. 31, 2016

Related U.S. Application Data

(63) Continuation of application No. 14/692,655, filed on Apr. 21, 2015, now Pat. No. 9,542,681, which is a (Continued)

(51) Int. Cl.
    *G06Q 20/10* (2012.01)
    *G06Q 20/40* (2012.01)
    *G06Q 20/20* (2012.01)

(52) U.S. Cl.
    CPC ......... *G06Q 20/405* (2013.01); *G06Q 20/204* (2013.01); *G06Q 20/209* (2013.01)

(58) Field of Classification Search
    None
    See application file for complete search history.

(56) References Cited

U.S. PATENT DOCUMENTS

| | | |
|---|---|---|
| 5,315,093 A | 5/1994 | Stewart |
| 5,590,038 A | 12/1996 | Pitroda |

(Continued)

FOREIGN PATENT DOCUMENTS

| | | |
|---|---|---|
| AU | 2017235924 A1 | 10/2017 |
| AU | 2018205104 A1 | 7/2018 |

(Continued)

OTHER PUBLICATIONS

"Another eBay Band-Aid Fails to Fix the New Pricing Structure Flaws," posted on Oct. 18, 2008, Retrieved from the Internet URL: https://thebrewsnews.wordpress.com/2008/10/18/another-ebay-band-aid-fails-to-fix-the-new-pricing-structure-flaws/, on May 16, 2016, pp. 1-4.

(Continued)

*Primary Examiner* — Paul Danneman
(74) *Attorney, Agent, or Firm* — Lee & Hayes, P.C.

(57) ABSTRACT

Disclosed herein are techniques for providing a digital receipt to a consumer upon tender of payment to a merchant through the use of a proxy payment card in a financial transaction. The proxy payment card can be associated with multiple financial accounts (e.g., accounts associated with credit cards, debit cards, or gift cards). The digital receipt is automatically received at a personal computing device of the consumer in response to the financial transaction being charged to a financial account associated with the proxy payment card. The digital receipt includes information indicative of the financial transaction. The digital receipt can also include one or more interactive components that allow the consumer to interact with the transaction (and/or merchant) subsequent to transmission of the receipt, such as adding a tip, providing feedback, redeeming a promotion reward, tracking loyalty reward points, or reviewing transaction records of past and present transactions.

20 Claims, 9 Drawing Sheets

Related U.S. Application Data continuation of application No. 14/513,076, filed on Oct. 13, 2014, now Pat. No. 9,064,249, which is a continuation of application No. 14/172,842, filed on Feb. 4, 2014, now Pat. No. 8,892,462.

(60) Provisional application No. 61/901,986, filed on Nov. 8, 2013, provisional application No. 61/894,322, filed on Oct. 22, 2013, provisional application No. 61/894,327, filed on Oct. 22, 2013.

(56) References Cited

U.S. PATENT DOCUMENTS

| | | | |
|---|---|---|---|
| 5,652,421 | A | 7/1997 | Veeneman et al. |
| 5,878,337 | A | 3/1999 | Joao et al. |
| 5,960,411 | A | 9/1999 | Hartman et al. |
| 6,026,387 | A | 2/2000 | Kesel |
| 6,076,079 | A | 6/2000 | Boston et al. |
| 6,154,738 | A | 11/2000 | Call |
| 6,175,922 | B1 | 1/2001 | Wang |
| 6,193,155 | B1 | 2/2001 | Walker et al. |
| 6,263,352 | B1 | 7/2001 | Cohen |
| 6,330,544 | B1 | 12/2001 | Walker et al. |
| 6,341,353 | B1 | 1/2002 | Herman et al. |
| 6,636,835 | B2 | 10/2003 | Ragsdale-Elliott et al. |
| 7,010,495 | B1 | 3/2006 | Samra et al. |
| 7,085,812 | B1 | 8/2006 | Sherwood |
| 7,136,448 | B1 | 11/2006 | Venkataperumal et al. |
| 7,155,411 | B1 | 12/2006 | Blinn et al. |
| 7,233,843 | B2 | 6/2007 | Budhraja et al. |
| 7,406,436 | B1 | 7/2008 | Reisman |
| 7,475,024 | B1 | 1/2009 | Phan |
| 7,478,054 | B1 | 1/2009 | Adams et al. |
| 7,493,390 | B2 | 2/2009 | Bobde et al. |
| 7,552,087 | B2 | 6/2009 | Schultz et al. |
| 7,575,166 | B2 | 8/2009 | McNamara |
| 7,580,873 | B1 | 8/2009 | Silver et al. |
| 7,603,382 | B2 | 10/2009 | Halt, Jr. |
| 7,764,185 | B1 | 7/2010 | Manz et al. |
| D621,849 | S | 8/2010 | Anzures et al. |
| 7,805,378 | B2 | 9/2010 | Berardi et al. |
| 7,810,729 | B2 | 10/2010 | Morley, Jr. |
| 7,818,809 | B1 | 10/2010 | Sobel et al. |
| 8,060,259 | B2 | 11/2011 | Budhraja et al. |
| 8,112,066 | B2 | 2/2012 | Ben Ayed |
| 8,190,514 | B2 | 5/2012 | Bishop et al. |
| 8,266,551 | B2 | 9/2012 | Boldyrev et al. |
| 8,396,808 | B2 | 3/2013 | Greenspan |
| 8,401,710 | B2 | 3/2013 | Budhraja et al. |
| 8,423,459 | B1 | 4/2013 | Green et al. |
| 8,434,682 | B1 | 5/2013 | Argue et al. |
| D683,755 | S | 6/2013 | Phelan |
| 8,459,544 | B2 | 6/2013 | Casey et al. |
| 8,498,888 | B1 | 7/2013 | Raff et al. |
| 8,571,916 | B1 | 10/2013 | Bruce et al. |
| 8,577,803 | B2 | 11/2013 | Chatterjee et al. |
| 8,577,810 | B1 | 11/2013 | Dalit et al. |
| 8,579,203 | B1 | 11/2013 | Lambeth et al. |
| D695,306 | S | 12/2013 | Gabouer et al. |
| 8,602,296 | B1 | 12/2013 | Velline et al. |
| 8,630,586 | B2 | 1/2014 | Dvortsov et al. |
| 8,645,014 | B1 | 2/2014 | Kozlowski et al. |
| 8,676,119 | B2 | 3/2014 | Cohen et al. |
| 8,682,806 | B1 | 3/2014 | Cate et al. |
| 8,694,357 | B2 | 4/2014 | Ting et al. |
| 8,732,085 | B2 | 5/2014 | Bennett |
| 8,788,418 | B2 | 7/2014 | Spodak et al. |
| 8,843,385 | B2 | 9/2014 | Jurca et al. |
| 8,855,312 | B1 | 10/2014 | Hodgman et al. |
| 8,859,337 | B2 | 10/2014 | Gaul et al. |
| 8,892,462 | B1 | 11/2014 | Borovsky et al. |
| D720,765 | S | 1/2015 | Xie et al. |
| D720,766 | S | 1/2015 | Mandal et al. |
| 8,939,357 | B1 | 1/2015 | Perry |
| D725,133 | S | 3/2015 | Smirin et al. |
| D725,666 | S | 3/2015 | Tseng et al. |
| 8,972,298 | B2 | 3/2015 | Kunz et al. |
| 9,010,644 | B1 | 4/2015 | Workley |
| D732,059 | S | 6/2015 | Andersen et al. |
| 9,064,249 | B1 * | 6/2015 | Borovsky ............ G06Q 20/204 |
| 9,092,767 | B1 | 7/2015 | Andrews et al. |
| 9,092,776 | B2 | 7/2015 | Dessert |
| 9,092,828 | B2 | 7/2015 | Hosp |
| 9,195,985 | B2 | 11/2015 | Domenica et al. |
| 9,224,141 | B1 | 12/2015 | Lamba et al. |
| D748,114 | S | 1/2016 | Leyon |
| D752,604 | S | 3/2016 | Zhang |
| D752,605 | S | 3/2016 | Wang |
| 9,542,681 | B1 | 1/2017 | Borovsky et al. |
| D786,906 | S | 5/2017 | Andersen et al. |
| 9,704,146 | B1 | 7/2017 | Morgan et al. |
| 9,721,251 | B1 | 8/2017 | Jen et al. |
| 9,799,021 | B1 | 10/2017 | Lee |
| 10,026,062 | B1 | 7/2018 | Sasmaz et al. |
| 10,217,092 | B1 | 2/2019 | Maxwell et al. |
| 2001/0054003 | A1 | 12/2001 | Chien et al. |
| 2002/0091646 | A1 | 7/2002 | Lake et al. |
| 2003/0014317 | A1 | 1/2003 | Siegel et al. |
| 2003/0061157 | A1 | 3/2003 | Hirka et al. |
| 2003/0065805 | A1 | 4/2003 | Barnes, Jr. |
| 2003/0115126 | A1 | 6/2003 | Pitroda |
| 2003/0115285 | A1 | 6/2003 | Lee et al. |
| 2003/0204447 | A1 | 10/2003 | Dalzell et al. |
| 2004/0030601 | A1 | 2/2004 | Pond et al. |
| 2004/0103065 | A1 | 5/2004 | Kishen et al. |
| 2004/0138999 | A1 | 7/2004 | Friedman et al. |
| 2004/0193489 | A1 | 9/2004 | Boyd et al. |
| 2004/0197489 | A1 | 10/2004 | Heuser et al. |
| 2004/0204990 | A1 | 10/2004 | Lee et al. |
| 2004/0215520 | A1 | 10/2004 | Butler et al. |
| 2004/0219971 | A1 | 11/2004 | Ciancio et al. |
| 2005/0055582 | A1 | 3/2005 | Bazakos et al. |
| 2005/0246245 | A1 | 11/2005 | Satchell et al. |
| 2006/0064373 | A1 | 3/2006 | Kelley |
| 2006/0085333 | A1 | 4/2006 | Wah et al. |
| 2006/0131385 | A1 | 6/2006 | Kim |
| 2006/0146839 | A1 | 7/2006 | Hurwitz et al. |
| 2006/0261149 | A1 | 11/2006 | Raghavendra Tulluri |
| 2007/0069013 | A1 | 3/2007 | Seifert et al. |
| 2007/0073619 | A1 | 3/2007 | Smith |
| 2007/0208930 | A1 | 9/2007 | Blank et al. |
| 2007/0244766 | A1 | 10/2007 | Goel |
| 2007/0255653 | A1 | 11/2007 | Tumminaro et al. |
| 2007/0255662 | A1 | 11/2007 | Tumminaro |
| 2008/0035725 | A1 | 2/2008 | Jambunathan et al. |
| 2008/0037442 | A1 | 2/2008 | Bill |
| 2008/0040265 | A1 | 2/2008 | Rackley, III et al. |
| 2008/0052176 | A1 | 2/2008 | Buchheit |
| 2008/0078831 | A1 | 4/2008 | Johnson et al. |
| 2008/0133351 | A1 | 6/2008 | White et al. |
| 2008/0177624 | A9 | 7/2008 | Dohse |
| 2008/0177826 | A1 | 7/2008 | Pitroda |
| 2008/0197188 | A1 | 8/2008 | Jagatic et al. |
| 2008/0262925 | A1 | 10/2008 | Kim et al. |
| 2008/0270246 | A1 | 10/2008 | Chen |
| 2008/0277465 | A1 | 11/2008 | Pletz et al. |
| 2008/0296978 | A1 | 12/2008 | Finkenzeller et al. |
| 2009/0070228 | A1 | 3/2009 | Ronen |
| 2009/0099961 | A1 | 4/2009 | Ogilvy |
| 2009/0106138 | A1 | 4/2009 | Smith et al. |
| 2009/0112766 | A1 | 4/2009 | Hammad et al. |
| 2009/0119190 | A1 | 5/2009 | Realini |
| 2009/0159663 | A1 | 6/2009 | Mullen et al. |
| 2009/0192904 | A1 | 7/2009 | Patterson et al. |
| 2009/0204472 | A1 | 8/2009 | Einhorn |
| 2009/0240558 | A1 | 9/2009 | Bandy et al. |
| 2009/0266884 | A1 | 10/2009 | Killian et al. |
| 2009/0271265 | A1 * | 10/2009 | Lay ................ G06Q 20/0453 705/14.38 |
| 2009/0288012 | A1 | 11/2009 | Hertel et al. |
| 2009/0313132 | A1 | 12/2009 | McKenna et al. |
| 2009/0319421 | A1 | 12/2009 | Mathis |
| 2009/0319638 | A1 | 12/2009 | Faith et al. |
| 2010/0010906 | A1 | 1/2010 | Grecia |

(56) References Cited

U.S. PATENT DOCUMENTS

| | | |
|---|---|---|
| 2010/0076777 A1 | 3/2010 | Paretti et al. |
| 2010/0082420 A1 | 4/2010 | Trifiletti et al. |
| 2010/0102125 A1 | 4/2010 | Gatto |
| 2010/0125495 A1 | 5/2010 | Smith et al. |
| 2010/0174596 A1 | 7/2010 | Gilman et al. |
| 2010/0185514 A1 | 7/2010 | Glazer et al. |
| 2010/0217675 A1 | 8/2010 | Bookstaff |
| 2010/0217699 A1 | 8/2010 | Bookstaff |
| 2010/0223145 A1 | 9/2010 | Dragt |
| 2010/0269059 A1 | 10/2010 | Othmer et al. |
| 2010/0280896 A1 | 11/2010 | Postrel |
| 2010/0306099 A1 | 12/2010 | Hirson et al. |
| 2010/0325048 A1 | 12/2010 | Carlson et al. |
| 2011/0029416 A1 | 2/2011 | Greenspan |
| 2011/0047013 A1 | 2/2011 | McKenzie, III |
| 2011/0055084 A1 | 3/2011 | Singh |
| 2011/0071892 A1 | 3/2011 | Dickelman |
| 2011/0087550 A1 | 4/2011 | Fordyce, III et al. |
| 2011/0112897 A1 | 5/2011 | Tietzen et al. |
| 2011/0131128 A1 | 6/2011 | Vaananen |
| 2011/0145049 A1 | 6/2011 | Hertel et al. |
| 2011/0145052 A1 | 6/2011 | Lin et al. |
| 2011/0178883 A1 | 7/2011 | Granbery et al. |
| 2011/0180598 A1 | 7/2011 | Morgan et al. |
| 2011/0218871 A1 | 9/2011 | Singh |
| 2011/0246284 A1 | 10/2011 | Chaikin et al. |
| 2011/0251892 A1 | 10/2011 | Laracey |
| 2011/0251962 A1 | 10/2011 | Hruska |
| 2011/0258014 A1 | 10/2011 | Evangelist et al. |
| 2011/0258689 A1 | 10/2011 | Cohen et al. |
| 2011/0270747 A1 | 11/2011 | Xu |
| 2011/0276418 A1 | 11/2011 | Velani |
| 2011/0295722 A1 | 12/2011 | Reisman |
| 2011/0295750 A1 | 12/2011 | Rammal |
| 2011/0302019 A1 | 12/2011 | Proctor, Jr. et al. |
| 2011/0302080 A1 | 12/2011 | White et al. |
| 2011/0313840 A1 | 12/2011 | Mason et al. |
| 2011/0313867 A9 | 12/2011 | Silver |
| 2011/0313871 A1 | 12/2011 | Greenwood |
| 2011/0320345 A1 | 12/2011 | Taveau et al. |
| 2012/0005076 A1 | 1/2012 | Dessert et al. |
| 2012/0011072 A1 | 1/2012 | Lodolo |
| 2012/0016731 A1 | 1/2012 | Smith et al. |
| 2012/0029990 A1 | 2/2012 | Fisher |
| 2012/0030044 A1 | 2/2012 | Hurst |
| 2012/0059701 A1 | 3/2012 | van der Veen et al. |
| 2012/0059718 A1 | 3/2012 | Ramer et al. |
| 2012/0059758 A1 | 3/2012 | Carlson |
| 2012/0066065 A1 | 3/2012 | Switzer |
| 2012/0084210 A1 | 4/2012 | Farahmand |
| 2012/0089418 A1 | 4/2012 | Kamath et al. |
| 2012/0095867 A1 | 4/2012 | McKelvey |
| 2012/0095871 A1 | 4/2012 | Dorsey et al. |
| 2012/0110568 A1 | 5/2012 | Abel et al. |
| 2012/0130785 A1 | 5/2012 | Postrel |
| 2012/0143772 A1 | 6/2012 | Abadir |
| 2012/0150611 A1 | 6/2012 | Isaacson et al. |
| 2012/0150643 A1 | 6/2012 | Wolfe et al. |
| 2012/0150742 A1 | 6/2012 | Poon et al. |
| 2012/0166311 A1 | 6/2012 | Dwight et al. |
| 2012/0185306 A1 | 7/2012 | Cheng |
| 2012/0185355 A1 | 7/2012 | Kilroy |
| 2012/0197740 A1 | 8/2012 | Grigg et al. |
| 2012/0197743 A1 | 8/2012 | Grigg et al. |
| 2012/0197794 A1 | 8/2012 | Grigg et al. |
| 2012/0198279 A1 | 8/2012 | Schroeder |
| 2012/0209749 A1 | 8/2012 | Hammad et al. |
| 2012/0209773 A1 | 8/2012 | Ranganathan |
| 2012/0214416 A1 | 8/2012 | Kent et al. |
| 2012/0244885 A1 | 9/2012 | Hefetz |
| 2012/0254031 A1 | 10/2012 | Walker et al. |
| 2012/0271707 A1 | 10/2012 | Harrison et al. |
| 2012/0271725 A1 | 10/2012 | Cheng |
| 2012/0278727 A1 | 11/2012 | Ananthakrishnan et al. |
| 2012/0284036 A1 | 11/2012 | Evans |
| 2012/0290422 A1 | 11/2012 | Bhinder |
| 2012/0290609 A1 | 11/2012 | Britt |
| 2012/0296679 A1 | 11/2012 | Im |
| 2012/0296726 A1 | 11/2012 | Dessert et al. |
| 2012/0323685 A1 | 12/2012 | Ullah |
| 2013/0006773 A1 | 1/2013 | Lutnick et al. |
| 2013/0019284 A1 | 1/2013 | Pacyga et al. |
| 2013/0024341 A1 | 1/2013 | Jeon et al. |
| 2013/0024364 A1 | 1/2013 | Shrivastava et al. |
| 2013/0024371 A1 | 1/2013 | Hariramani et al. |
| 2013/0030889 A1 | 1/2013 | Davich et al. |
| 2013/0036065 A1 | 2/2013 | Chen et al. |
| 2013/0041824 A1 | 2/2013 | Gupta |
| 2013/0048719 A1 | 2/2013 | Bennett |
| 2013/0050080 A1 | 2/2013 | Dahl et al. |
| 2013/0054320 A1 | 2/2013 | Dorso et al. |
| 2013/0065672 A1 | 3/2013 | Gelman et al. |
| 2013/0066783 A1 | 3/2013 | Wolff |
| 2013/0073363 A1 | 3/2013 | Boal |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0124361 A1 | 5/2013 | Bryson |
| 2013/0132140 A1 | 5/2013 | Amin et al. |
| 2013/0132182 A1 | 5/2013 | Fung et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0134962 A1 | 5/2013 | Kamel et al. |
| 2013/0138563 A1 | 5/2013 | Gilder et al. |
| 2013/0144707 A1 | 6/2013 | Issacson et al. |
| 2013/0151613 A1 | 6/2013 | Dhawan et al. |
| 2013/0159081 A1 | 6/2013 | Shastry et al. |
| 2013/0159172 A1 | 6/2013 | Kim |
| 2013/0159173 A1 | 6/2013 | Sivaraman et al. |
| 2013/0159446 A1 | 6/2013 | Carlson et al. |
| 2013/0166402 A1 | 6/2013 | Parento et al. |
| 2013/0166445 A1 | 6/2013 | Issacson et al. |
| 2013/0173407 A1 | 7/2013 | Killian et al. |
| 2013/0179227 A1 | 7/2013 | Booth et al. |
| 2013/0181045 A1 | 7/2013 | Dessert et al. |
| 2013/0191194 A1 | 7/2013 | Shreibati et al. |
| 2013/0198018 A1 | 8/2013 | Baig |
| 2013/0204727 A1 | 8/2013 | Rothschild |
| 2013/0204777 A1 | 8/2013 | Irwin, Jr. et al. |
| 2013/0204793 A1 | 8/2013 | Kerridge et al. |
| 2013/0218697 A1 | 8/2013 | Kingston et al. |
| 2013/0218721 A1 | 8/2013 | Borhan et al. |
| 2013/0225081 A1 | 8/2013 | Doss et al. |
| 2013/0228616 A1 | 9/2013 | Bhosle et al. |
| 2013/0236109 A1 | 9/2013 | Madden et al. |
| 2013/0246203 A1 | 9/2013 | Laracey |
| 2013/0246207 A1 | 9/2013 | Novak et al. |
| 2013/0246280 A1 | 9/2013 | Kirsch |
| 2013/0246301 A1 | 9/2013 | Radhakrishnan et al. |
| 2013/0248591 A1 | 9/2013 | Look et al. |
| 2013/0268431 A1 | 10/2013 | Mohsenzadeh |
| 2013/0290173 A1 | 10/2013 | Nemeroff |
| 2013/0290522 A1 | 10/2013 | Behm, Jr. |
| 2013/0291018 A1 | 10/2013 | Billings et al. |
| 2013/0295882 A1 | 11/2013 | Zhao |
| 2013/0297933 A1 | 11/2013 | Fiducia et al. |
| 2013/0317835 A1 | 11/2013 | Mathew |
| 2013/0317886 A1 | 11/2013 | Kiran et al. |
| 2013/0317950 A1 | 11/2013 | Abraham et al. |
| 2013/0332354 A1 | 12/2013 | Rhee et al. |
| 2013/0332385 A1 | 12/2013 | Kilroy et al. |
| 2013/0339253 A1 | 12/2013 | Sincai |
| 2013/0346223 A1 | 12/2013 | Prabhu et al. |
| 2014/0006205 A1 | 1/2014 | Berry et al. |
| 2014/0012754 A1 | 1/2014 | Hanson et al. |
| 2014/0019236 A1 | 1/2014 | Argue et al. |
| 2014/0025446 A1 | 1/2014 | Nagarajan et al. |
| 2014/0032297 A1 | 1/2014 | Germann et al. |
| 2014/0052613 A1 | 2/2014 | Tavakoli et al. |
| 2014/0052617 A1 | 2/2014 | Chawla et al. |
| 2014/0057667 A1 | 2/2014 | Blankenship et al. |
| 2014/0058861 A1 | 2/2014 | Argue et al. |

(56) References Cited

U.S. PATENT DOCUMENTS

| | | |
|---|---|---|
| 2014/0059466 A1 | 2/2014 | Mairs et al. |
| 2014/0067557 A1 | 3/2014 | van Niekerk et al. |
| 2014/0074569 A1 | 3/2014 | Francis et al. |
| 2014/0074655 A1 | 3/2014 | Lim et al. |
| 2014/0074658 A1 | 3/2014 | Sanchez |
| 2014/0074691 A1 | 3/2014 | Bank et al. |
| 2014/0074716 A1 | 3/2014 | Ni |
| 2014/0081783 A1 | 3/2014 | Paranjape et al. |
| 2014/0081853 A1 | 3/2014 | Sanchez et al. |
| 2014/0081854 A1 | 3/2014 | Sanchez et al. |
| 2014/0084059 A1 | 3/2014 | Sierchio et al. |
| 2014/0089073 A1 | 3/2014 | Jacobs et al. |
| 2014/0089078 A1 | 3/2014 | Dessert et al. |
| 2014/0096179 A1 | 4/2014 | Ben-Shalom et al. |
| 2014/0099888 A1 | 4/2014 | Flanagan et al. |
| 2014/0100931 A1 | 4/2014 | Sanchez et al. |
| 2014/0100973 A1 | 4/2014 | Brown et al. |
| 2014/0101737 A1 | 4/2014 | Rhee |
| 2014/0108245 A1 | 4/2014 | Drummond et al. |
| 2014/0114775 A1 | 4/2014 | Cloin et al. |
| 2014/0114781 A1 | 4/2014 | Watanabe |
| 2014/0122345 A1 | 5/2014 | Argue et al. |
| 2014/0129135 A1 | 5/2014 | Holden et al. |
| 2014/0129302 A1 | 5/2014 | Amin et al. |
| 2014/0129357 A1 | 5/2014 | Goodwin |
| 2014/0129942 A1 | 5/2014 | Rathod |
| 2014/0129951 A1 | 5/2014 | Amin et al. |
| 2014/0136318 A1 | 5/2014 | Alberth, Jr. et al. |
| 2014/0136349 A1 | 5/2014 | Dave et al. |
| 2014/0143157 A1 | 5/2014 | Jeffs et al. |
| 2014/0149282 A1 | 5/2014 | Philliou et al. |
| 2014/0156508 A1 | 6/2014 | Argue et al. |
| 2014/0156517 A1 | 6/2014 | Argue et al. |
| 2014/0164234 A1 | 6/2014 | Coffman et al. |
| 2014/0180805 A1 | 6/2014 | Argue et al. |
| 2014/0184505 A1 | 7/2014 | Fullerton et al. |
| 2014/0201067 A1 | 7/2014 | Lai et al. |
| 2014/0207669 A1 | 7/2014 | Rosenberg |
| 2014/0214567 A1 | 7/2014 | Llach et al. |
| 2014/0214652 A1 | 7/2014 | Zheng et al. |
| 2014/0236762 A1 | 8/2014 | Gerber et al. |
| 2014/0244489 A1 | 8/2014 | Kessler et al. |
| 2014/0249947 A1 | 9/2014 | Hicks et al. |
| 2014/0250002 A1 | 9/2014 | Isaacson et al. |
| 2014/0254820 A1 | 9/2014 | Gardenfors et al. |
| 2014/0257958 A1 | 9/2014 | Andrews |
| 2014/0278589 A1 | 9/2014 | Rados et al. |
| 2014/0279098 A1 | 9/2014 | Ham |
| 2014/0279184 A1 | 9/2014 | Lai et al. |
| 2014/0344102 A1 | 11/2014 | Cooper |
| 2014/0351004 A1 | 11/2014 | Flett |
| 2014/0379497 A1 | 12/2014 | Varma et al. |
| 2014/0379536 A1 | 12/2014 | Varma et al. |
| 2014/0379580 A1 | 12/2014 | Varma et al. |
| 2015/0012426 A1 | 1/2015 | Purves et al. |
| 2015/0025983 A1 | 1/2015 | Cicerchi |
| 2015/0032567 A1 | 1/2015 | Bhatia |
| 2015/0058146 A1 | 2/2015 | Gaddam et al. |
| 2015/0066699 A1 | 3/2015 | Fisher |
| 2015/0066765 A1 | 3/2015 | Banks et al. |
| 2015/0073907 A1 | 3/2015 | Purves et al. |
| 2015/0073989 A1 | 3/2015 | Green et al. |
| 2015/0095134 A1 | 4/2015 | Parker et al. |
| 2015/0095228 A1 | 4/2015 | Su et al. |
| 2015/0100481 A1 | 4/2015 | Ghosh et al. |
| 2015/0112822 A1 | 4/2015 | Aaron et al. |
| 2015/0112838 A1 | 4/2015 | Li et al. |
| 2015/0120418 A1 | 4/2015 | Cervenka et al. |
| 2015/0134439 A1 | 5/2015 | Maxwell et al. |
| 2015/0134513 A1 | 5/2015 | Olson et al. |
| 2015/0134528 A1 | 5/2015 | Fineman et al. |
| 2015/0178755 A1 | 6/2015 | Barroso |
| 2015/0187021 A1 | 7/2015 | Moring et al. |
| 2015/0194023 A1 | 7/2015 | Brackenridge et al. |
| 2015/0294312 A1 | 10/2015 | Kendrick et al. |
| 2015/0304270 A1 | 10/2015 | Cook |
| 2015/0332223 A1 | 11/2015 | Aaron et al. |
| 2015/0332237 A1 | 11/2015 | Aaron et al. |
| 2016/0086166 A1 | 3/2016 | Pomeroy et al. |
| 2018/0150807 A1 | 5/2018 | Aaron et al. |

FOREIGN PATENT DOCUMENTS

| | | |
|---|---|---|
| CA | 2 916 603 A1 | 12/2014 |
| CA | 2 930 186 A1 | 5/2015 |
| GB | 2530451 A | 3/2016 |
| KR | 10-2006-0103089 A | 9/2006 |
| WO | 2011/014875 A1 | 2/2011 |
| WO | 2014/210020 A1 | 12/2014 |
| WO | 2015/061005 A1 | 4/2015 |
| WO | 2015/069389 A1 | 5/2015 |
| WO | 2015/100378 A1 | 7/2015 |
| WO | 2015/179316 A1 | 11/2015 |

OTHER PUBLICATIONS

"Merchantindustry.com—Best Merchant Services," Retrieved from Internet URL: https://web.archive.org/web/20121020212419/http://www.merchantindustry.com/, on Dec. 30, 2015, pp. 1-7.

"Online Shopping," dated Nov. 2, 2014, Retrieved from the Internet URL: http://en.wikipedia.org/wiki/Online_shopping, on Nov. 10, 2014, pp. 1-12.

"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.

Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.

Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.

Non-Final Office Action dated Apr. 4, 2014, for U.S. Appl. No. 14/172,842, of Borovsky, A., et al., filed Feb. 4, 2014.

Non-Final Office Action dated Apr. 10, 2014, for U.S. Appl. No. 14/160,490, of Moring, D., et al., filed Jan. 21, 2014.

Non-Final Office Action dated May 29, 2014, for U.S. Appl. No. 13/837,562, of Chin, H.C.A., et al., filed Mar. 15, 2013.

Notice of Allowance dated Aug. 1, 2014, for U.S. Appl. No. 14/172,842, of Borovsky, A., et al., filed Feb. 4, 2014.

Non-Final Office Action dated Aug. 27, 2014, for U.S. Appl. No. 14/165,256, of Aaron, P., filed Jan. 27, 2014.

Final Office Action dated Aug. 28, 2014, for U.S. Appl. No. 14/160,490, of Moring, D., et al., filed Jan. 21, 2014.

Advisory Action dated Nov. 18, 2014, for U.S. Appl. No. 14/160,490, of Moring, D., et al., filed Jan. 21, 2014.

Non-Final Office Action dated Jan. 9, 2015, for U.S. Appl. No. 14/145,895, of Aaron, P., et al., filed Dec. 31, 2013.

Final Office Action dated Jan. 26, 2015, for U.S. Appl. No. 13/837,562, of Chin, H.C.A., et al., filed Mar. 15, 2013.

Notice of Allowance dated Feb. 20, 2015, for U.S. Appl. No. 14/513,076, of Borovsky, A., et al., filed Oct. 13, 2014.

Final Office Action dated Mar. 17, 2015, for U.S. Appl. No. 14/165,256, of Aaron, P., filed Jan. 27, 2014.

Non-Final Office Action dated Mar. 19, 2015, for U.S. Appl. No. 14/329,638, of Aaron, P., et al., filed Jul. 11, 2014.

Non-Final Office Action dated Apr. 27, 2015, for U.S. Appl. No. 14/184,503, of Borovsky, A., et al., filed Feb. 19, 2014.

(56) References Cited

OTHER PUBLICATIONS

Non-Final Office Action dated May 12, 2015, for U.S. Appl. No. 14/189,869, of Lamba, K., et al., filed Feb. 25, 2014.
Non-Final Office Action dated May 20, 2015, for U.S. Appl. No. 13/829,080, of Morgan, T.B., et al., filed Mar. 14, 2013.
Non-Final Office Action dated May 26, 2015, for U.S. Appl. No. 14/225,338, of Aaron, P., et al., filed Mar. 25, 2014.
Non-Final Office Action dated May 27, 2015, for U.S. Appl. No. 14/197,704, of Lamba, K., et al., filed Mar. 5, 2014.
Non-Final Office Action dated Jul. 2, 2015, for U.S. Appl. No. 14/208,800, of Thome, J.P., et al., filed Mar. 13, 2014.
Non-Final Office Action dated Jul. 10, 2015, for U.S. Appl. No. 14/526,361, of White, M.W., et al., filed Oct. 28, 2014.
Non-Final Office Action dated Jun. 11, 2015, for U.S. Appl. No. 14/692,655, of Borovsky, A., et al., filed Apr. 21, 2015.
Final Office Action dated Aug. 18, 2015, for U.S. Appl. No. 14/145,895, of Aaron, P., et al., filed Dec. 31, 2013.
Final Office Action dated Sep. 17, 2015, for U.S. Appl. No. 13/829,080, of Morgan, T.B., et al., filed Mar. 14, 2013.
Notice of Allowance dated Sep. 18, 2015, for U.S. Appl. No. 14/197,704, of Lamba, K., et al., filed Mar. 5, 2014.
Final Office Action dated Sep. 21, 2015, for U.S. Appl. No. 14/184,503, of Borovsky, A., et al., filed Feb. 19, 2014.
Non-Final Office Action dated Sep. 30, 2015, for U.S. Appl. No. 14/189,880, of Aaron, P., filed Feb. 25, 2014.
Final Office Action dated Oct. 2, 2015, for U.S. Appl. No. 14/225,338, of Aaron, P., et al., filed Mar. 25, 2014.
Final Office Action dated Oct. 5, 2015, for U.S. Appl. No. 14/526,361, of White, M.W., et al., filed Oct. 28, 2014.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/149,754, of Spindel, N., et al., filed Jan. 7, 2014.
Non-Final Office Action dated Oct. 8, 2015, for U.S. Appl. No. 14/165,256, of Aaron, P., filed Jan. 27, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 4, 2015, for U.S. Appl. No. 14/184,503, of Borovsky, A., et al., filed Feb. 19, 2014.
Advisory Action dated Dec. 30, 2015, for U.S. Appl. No. 14/692,655, of Borovsky, A., et al., filed Apr. 21, 2015.
Final Office Action dated Dec. 31, 2015, for U.S. Appl. No. 14/208,800, of Thome, J.P., et al., filed Mar. 13, 2014.
Advisory Action dated Dec. 31, 2015, for U.S. Appl. No. 14/225,338, of Aaron, P., et al., filed Mar. 25, 2014.
Advisory Action dated Jan. 21, 2016, for U.S. Appl. No. 14/526,361, of White, M.W., et al., filed Oct. 28, 2014.
Non-Final Office Action dated Jan. 22, 2016, for U.S. Appl. No. 14/189,869, of Lamba, K., et al., filed Feb. 25, 2014.
Non-Final Office Action dated Feb. 2, 2016, for U.S. Appl. No. 13/829,080, of Morgan, T.B., et al., filed Mar. 14, 2013.
Non-Final Office Action dated Jan. 20, 2017, for U.S. Appl. No. 14/168,274, of Odawa, A.W., et al., filed Jan. 30, 2014.
Examiner Requisition for Canadian Patent Application No. 2,930,186, dated Jan. 30, 2017.
Notice of Acceptance for Australian Patent Application No. 2014347192, dated Feb. 16, 2017.
Advisory Action dated Feb. 24, 2017, for U.S. Appl. No. 14/526,361, of White, M.W., et al., filed Oct. 28, 2014.
Corrected Notice of Allowance dated Feb. 27, 2017, for U.S. Appl. No. 14/329,658, of Aaron, P., et al., filed Jul. 11, 2014.
Notice of Allowance dated Mar. 2, 2017, for U.S. Appl. No. 13/829,080, of Morgan, T.B., et al., filed Mar. 14, 2013.
Final Office Action dated Mar. 2, 2017, for U.S. Appl. No. 14/189,880, of Aaron, P., et al., filed Feb. 25, 2014.
Advisory Action dated Mar. 9, 2017, for U.S. Appl. No. 14/184,503, of Borovsky, A., et al., filed Feb. 19, 2014.
Non-Final Office Action dated Mar. 13, 2017, for U.S. Appl. No. 14/189,869, of Lamba, K., et al., filed Feb. 25, 2014.
Non-Final Office Action dated Mar. 15, 2017, for U.S. Appl. No. 13/829,658, of Morgan, T.B., et al., filed Mar. 14, 2013.
Final Office Action dated Nov. 17, 2017, for U.S. Appl. No. 14/730,860, of Sasmaz, Y., et al., filed Jun. 4, 2015.
Notice of Allowance dated Nov. 24, 2017, for U.S. Appl. No. 13/829,658, of Morgan, T.B., et al., filed Mar. 14, 2013.
Non-Final Office Action dated Dec. 13, 2017, for U.S. Appl. No. 14/312,397, of Varma, A.K., et al., filed Jun. 23, 2014.
Final Office Action dated Nov. 10, 2016, for U.S. Appl. No. 13/830,350, of Morgan, T.B., et al., filed Mar. 14, 2013.
Final Office Action dated Nov. 14, 2016, for U.S. Appl. No. 14/526,361, of White, M.W., et al., filed Oct. 28, 2014.
Final Office Action dated Nov. 29, 2016, for U.S. Appl. No. 14/088,113, of Maxwell, D.W., et al., filed Nov. 22, 2013.
Final Office Action dated Nov. 30, 2016, for U.S. Appl. No. 14/208,800, of Thome, J.P., et al., filed Mar. 13, 2014.
Final Office Action dated Dec. 12, 2016, for U.S. Appl. No. 14/088,141, of Maxwell, D.W., et al., filed Nov. 22, 2013.
Advisory Action dated Dec. 22, 2016, for U.S. Appl. No. 14/145,895, of Aaron, P., et al., filed Dec. 31, 2013.
Final Office Action dated Dec. 27, 2016, for U.S. Appl. No. 14/184,503, of Borovsky, A., et al., filed Feb. 19, 2014.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examination Report No. 1 for Australian Patent Application No. 2014347192, dated Dec. 15, 2016.
Final Office Action dated Aug. 10, 2017, for U.S. Appl. No. 14/160,490, of Moring, D., et al., filed Jan. 21, 2014.
Final Office Action dated Sep. 15, 2017, for U.S. Appl. No. 14/182,655, of Spindel, N., et al., filed Feb. 18, 2014.
Examination Report No. 2 for Australian Patent Application No. 2014302661, dated Sep. 26, 2017.
Advisory Action dated Oct. 31, 2017, for U.S. Appl. No. 14/160,490, of Moring, D., et al., filed Jan. 21, 2014.
Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.
Non-Final Office Action dated Dec. 29, 2017, for U.S. Appl. No. 14/165,256, of Aaron, P., filed Jan. 27, 2014.
Examiner's Requisition for Canadian Patent Application No. 2,930,186, dated Jan. 11, 2018.
Final Office Action dated Jan. 22, 2018, for U.S. Appl. No. 13/830,350, of Morgan, T.B., et al., filed Mar. 14, 2013.
Examiner's Requisition for Canadian Patent Application No. 2,916,603, dated Feb. 15, 2018.
Bruene, J., "Capital One Add Rewards to Mobile App, Includes Ability to Redeem from Previous Travel," netbanker.com, published Apr. 20, 2012, Retrieved from the Internet URL: https://web.archive.org/web/20120425043052/http://www.netbanker.com/2012/04/capital_one_add_rewards_to_mobile_app_includes_ability_to_redeem_for_previous_travel.html, on Aug. 10, 2018, pp. 1-2.
Joy, "Square Wallet—an iOS App updated to send gift cards," Top Apps, dated Apr. 6, 2013, Retrieved from the Internet URL: http://www.topapps.net/apple-ios/square-wallet-an-ios-app-updated-to-send-gift-cards.html/, pp. 1-3.
Konrad, J., "A Traveler's Review of the Capital One Venture Rewards Card," Runaway truck, dated on Jul. 11, 2013, Retrieved from the Internet URL: http://web.archive.org/web/20130923122057/http://queenofsubtle.com/rt/travel-tips/a-travelers-review-of-the-capital-one-venture-rewards-card, pp. 1-2.
Non-Final Office Action dated Mar. 3, 2015, for U.S. Appl. No. 14/506,534, of Aaron, P., et al., filed Oct. 3, 2014.

(56) References Cited

OTHER PUBLICATIONS

Final Office Action dated Jun. 24, 2015, for U.S. Appl. No. 14/506,534, of Aaron, P., et al., filed Oct. 3, 2014.
Non-Final Office Action dated Apr. 8, 2016, for U.S. Appl. No. 14/187,104, of Lee, R., filed Feb. 21, 2014.
Non-Final Office Action dated May 17, 2016, for U.S. Appl. No. 29/530,241, of Andersen, R., et al., filed Jun. 15, 2015.
Final Office Action dated Oct. 5, 2016, for Design U.S. Appl. No. 29/530,241, of Andersen, R., et al., filed Jun. 15, 2015.
Non-Final Office Action dated Dec. 7, 2016, for U.S. Appl. No. 14/187,104, of Lee, R., filed Feb. 21, 2014.
Notice of Allowance dated Jan. 3, 2017, for Design U.S. Appl. No. 29/530,241, of Andersen, R., et al., filed Jun. 15, 2015.
Non-Final Office Action dated Mar. 1, 2017, for U.S. Appl. No. 14/220,064, of Maxwell, D.W., et al., filed Mar. 19, 2014.
Notice of Allowance dated Jun. 21, 2017, for U.S. Appl. No. 14/187,104, of Lee, R., filed Feb. 21, 2014.
Final Office Action dated Sep. 20, 2017, for U.S. Appl. No. 14/220,064, of Maxwell, D.W., et al., filed Mar. 19, 2014.
Notice of Allowance dated Mar. 15, 2018, for U.S. Appl. No. 14/730,860, of Sasmaz, Y., et al., filed Jun. 4, 2015.
Non-Final Office Action dated Apr. 5, 2018, for U.S. Appl. No. 14/088,113, of Maxwell, D.W., et al., filed Nov. 22, 2013.
Non-Final Office Action dated Apr. 18, 2018, for U.S. Appl. No. 14/088,141, of Maxwell, D.W., et al., filed Nov. 22, 2013.
Examination Report No. 2 for Australian Patent Application No. 2015264426, dated Jun. 20, 2018.
Non-Final Office Action dated Aug. 3, 2018, for U.S. Appl. No. 14/220,064, of Maxwell, D.W., et al., filed Mar. 19, 2014.
Non-Final Office Action dated Mar. 14, 2016, for U.S. Appl. No. 14/692,655, of Borovsky, A., et al., filed Apr. 21, 2015.
Non-Final Office Action dated Mar. 24, 2016, for U.S. Appl. No. 14/145,895, of Aaron, P., et al., filed Dec. 31, 2013.
Non-Final Office Action dated Apr. 8, 2016, for U.S. Appl. No. 14/526,361, of White, M.W., et al., filed Oct. 28, 2014.
Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Final Office Action dated Apr. 28, 2016, for U.S. Appl. No. 14/189,880, of Aaron, P., et al., filed Feb. 25, 2014.
Non-Final Office Action dated May 3, 2016, for U.S. Appl. No. 13/830,350, of Morgan, T.B., et al., filed Mar. 14, 2013.
Non-Final Office Action dated May 9, 2016, for U.S. Appl. No. 14/225,338, of Aaron, P., et al., filed Mar. 25, 2014.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 7, 2016, for U.S. Appl. No. 14/208,800, of Thome, J.P., et al., filed Mar. 13, 2014.
Non-Final Office Action dated Jun. 8, 2016, for U.S. Appl. No. 14/088,141, of Maxwell, D.W., et al., filed Nov. 22, 2013.
Non-Final Office Action dated Jun. 17, 2016, for U.S. Appl. No. 14/184,503, of Borovsky, A., et al., filed Feb. 19, 2014.
Final Office Action dated Jun. 17, 2016, for U.S. Appl. No. 14/149,754, of Spindel, N., et al., filed Jan. 7, 2014.
Final Office Action dated Jun. 20, 2016, for U.S. Appl. No. 13/829,658, of Morgan, T.B., et al., filed Mar. 14, 2013.
Non-Final Office Action dated Jul. 14, 2016, for U.S. Appl. No. 14/160,490, of Moring, D., et al., filed Jan. 21, 2014.
Final Office Action dated Jul. 18, 2016, for U.S. Appl. No. 14/189,869, of Lamba, K., et al., filed Feb. 25, 2014.
Non-Final Office Action dated Jul. 21, 2016, for U.S. Appl. No. 14/329,638, of Aaron, P., et al., filed Jul. 11, 2014.
Final Office Action dated Sep. 1, 2016, for U.S. Appl. No. 14/225,338, of Aaron, P., et al., filed Mar. 25, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Advisory Action dated Sep. 21, 2016, for U.S. Appl. No. 14/149,754, of Spindel, N., et al., filed Jan. 7, 2014.
Non-Final Office Action dated Sep. 21, 2016, for U.S. Appl. No. 14/189,880, of Aaron, P., filed Feb. 25, 2014.
Non-Final Office Action dated Sep. 22, 2016, for U.S. Appl. No. 14/182,655, of Spindel, N., et al., filed Feb. 18, 2014.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Advisory Action dated Oct. 11, 2016, for U.S. Appl. No. 14/189,869, of Lamba, K., et al., filed Feb. 25, 2014.
Final Office Action dated Oct. 12, 2016, for U.S. Appl. No. 14/145,895, of Aaron, P., et al., filed Dec. 31, 2013.
Final Office Action dated Nov. 1, 2016, for U.S. Appl. No. 14/160,490, of Moring, D., et al., filed Jan. 21, 2014.
Notice of Allowance dated Nov. 8, 2016, for U.S. Appl. No. 14/225,338, of Aaron, P., et al., filed Mar. 25, 2014.
International Search Report and Written Opinion for PCT Application No. PCT/US2014/058398 dated Dec. 24, 2014.
International Search Report and Written Opinion for PCT Application No. PCT/US2014/058447 dated Jan. 15, 2015.
International Search Report and Written Opinion for PCT Application No. PCT/US2014/072269 dated Mar. 31, 2015.
International Search Report and Written Opinion for PCT Application No. PCT/US2015/031423 dated Aug. 13, 2015.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Payment Gateway," Wikipedia, published May 30, 2014, Retrieved from the Internet URL: http://en.wikipedia.org/wiki/Payment gateways, on Jun. 6, 2014, pp. 1-3.
"ProPay JAK Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Verified by Visa Acquirer and Merchant Implementation Guide," U.S. Region, Visa Public, May 2011, pp. 1-114.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Punch, L., "E-commerce: Just what does card-present mean these days," dated Oct. 1, 2012, Retrieved from the Internet URL: http://digitaltransactions.net/news/ story/ E-Commerce_-Just-What-Does-Card-Present-Mean-These-Days, on Feb. 17, 2015, pp. 1-4.
Non-Final Office Action dated Dec. 1, 2014, for U.S. Appl. No. 14/062,617, of Templeton, T., et al., filed Oct. 24, 2013.
Non Final Office Action dated Dec. 15, 2014, for U.S. Appl. No. 14/312,397, of Varma, A.K., et al., filed Jun. 23, 2014.
Final Office Action dated Apr. 16, 2015, for U.S. Appl. No. 14/062,617, of Templeton, T., et al., filed Oct. 24, 2013.
Final Office Action dated Aug. 31, 2015, for U.S. Appl. No. 14/312,397, of Varma, A.K., et al., filed Jun. 23, 2014.
Non-Final Office Action dated Jan. 14, 2016, for U.S. Appl. No. 14/312,397, of Varma, A.K., et al., filed Jun. 23, 2014.
Non-Final Office Action dated Feb. 23, 2016, for U.S. Appl. No. 14/062,617, of Templeton, T., et al., filed Oct. 24, 2013.
Non-Final Office Action dated May 5, 2016, for U.S. Appl. No. 14/312,397, of Varma, A.K., et al., filed Jun. 23, 2014.
Non-Final Office Action dated Aug. 10, 2016, for U.S. Appl. No. 14/312,433, of Varma, A.K., et al., filed Jun. 23, 2014.
Final Office Action dated Sep. 1, 2016, for U.S. Appl. No. 14/062,617, of Templeton, T., et al., filed Oct. 24, 2013.
Non-Final Office Action dated Sep. 8, 2016, for U.S. Appl. No. 14/312,371, of Varma, A.K., et al., filed Jun. 23, 2014.
Examination Report No. 1 for Australian Patent Application No. 2014302661, dated Sep. 27, 2016.
Non-Final Office Action dated Nov. 17, 2016, for U.S. Appl. No. 14/701,571, of Jen, M., et al., filed May 1, 2015.

(56) References Cited

OTHER PUBLICATIONS

Advisory Action dated Nov. 28, 2016, for U.S. Appl. No. 14/062,617, of Templeton, T., et al., filed Oct. 24, 2013.
Final Office Action dated Nov. 28, 2016, for U.S. Appl. No. 14/312,397, of Varma, A.K., et al., filed Jun. 23, 2014.
Examiner's Requisition for Canadian Patent Application No. 2,916,603, dated Feb. 9, 2017.
Notice of Allowance dated Mar. 23, 2017, for U.S. Appl. No. 14/701,571, of Jen, M., et al., filed May 1, 2015.
Advisory Action dated Apr. 10, 2017, for U.S. Appl. No. 14/312,397, of Varma, A.K., et al., filed Jun. 23, 2014.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.
Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.
Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/043891, dated Dec. 10, 2014.
Final Office Action dated Oct. 19, 2018, for U.S. Appl. No. 14/088,113, of Maxwell, D.W., et al., filed Nov. 22, 2013.
Notice of Allowance dated Oct. 30, 2018, for U.S. Appl. No. 14/088,141, of Maxwell, D.W., et al., filed Nov. 22, 2013.
Examiner Requisition for Canadian Patent Application No. 2,930,186, dated Nov. 28, 2018.
Non-Final Office Action dated Jan. 14, 2019, for U.S. Appl. No. 14/088,113, of Maxwell, D.W., et al., filed Nov. 22, 2013.
Final Office Action dated Feb. 26, 2019, for U.S. Appl. No. 14/220,064, of Maxwell, D.W., et al., filed Mar. 19, 2014.
Advisory Action dated Apr. 26, 2019, for U.S. Appl. No. 14/220,064, of Maxwell, D.W., et al., filed Mar. 19, 2014.
Final Office Action dated May 16, 2019, for U.S. Appl. No. 14/088,113 of Maxwell, D.W., et al., filed Nov. 22, 2013.
Non-Final Office Action dated May 31, 2019, for U.S. Appl. No. 15/582,300, of Aaron, P., et al., filed Apr. 28, 2017.

\* cited by examiner

PROXY CARD PAYMENT WITH DIGITAL RECEIPT DELIVERY

CROSS-REFERENCE TO RELATED APPLICATIONS

This application is a continuation of U.S. Nonprovisional patent application Ser. No. 14/692,655, now granted U.S. Pat. No. 9,542,681, entitled "PROXY CARD PAYMENT WITH DIGITAL RECEIPT DELIVERY," and filed Apr. 21, 2015 which is a continuation of U.S. Pat. No. 9,064,249, entitled "PROXY CARD PAYMENT WITH DIGITAL RECEIPT DELIVERY," and filed Oct. 13, 2014, which is a continuation of U.S. Pat. No. 8,892,462, entitled "PROXY CARD PAYMENT WITH DIGITAL RECEIPT DELIVERY," and filed Feb. 4, 2014 and also claims the benefit of U.S. Provisional Patent Application No. 61/901,986, entitled "INTERACTIVE DIGITAL RECEIPT," filed on Nov. 8, 2013, and U.S. Provisional Patent Application No. 61/894,327, entitled "PROXY FOR MULTIPLE PAYMENT MECHANISMS," filed on Oct. 22, 2013 and U.S. Provisional Patent Application No. 61/894,322, entitled "AUTHORIZING A PURCHASE TRANSACTION USING A MOBILE DEVICE," filed on Oct. 22, 2013, all of which are incorporated by reference herein in their entireties.

BACKGROUND

Today, an increasing number of financial transactions between merchants and consumers are being conducted electronically. Many merchants have started to provide customers with receipts electronically (e.g., email or online customer account). Consumers, on the other hand, have a variety of electronic based options to pay merchants (e.g., credit cards, debit cards, prepaid gift cards, or digital wallet), without the burden of having to carry cash. While these mechanisms improve the financial transaction experience, they also present many challenges.

For example, existing receipt solutions generally require merchants to take on extensive infrastructure changes, provide limited functionalities, and make management and access a hassle for consumers due to the variety of receipts (e.g., delivery method, set-up, format, etc.). Further, while the various payment options give flexibility to consumers, carrying such an array of payment options can be inconvenient and burdensome (e.g., an overstuffed wallet or purse). At the end of the day, a consumer would have to remember which payment option(s) she has used at which merchant(s), and how or where to access the receipts associated with the various merchants.

BRIEF DESCRIPTION OF THE DRAWINGS

Embodiments of the present invention will be described and explained through the use of the accompanying drawings in which.

DETAILED DESCRIPTION

Figure 1:
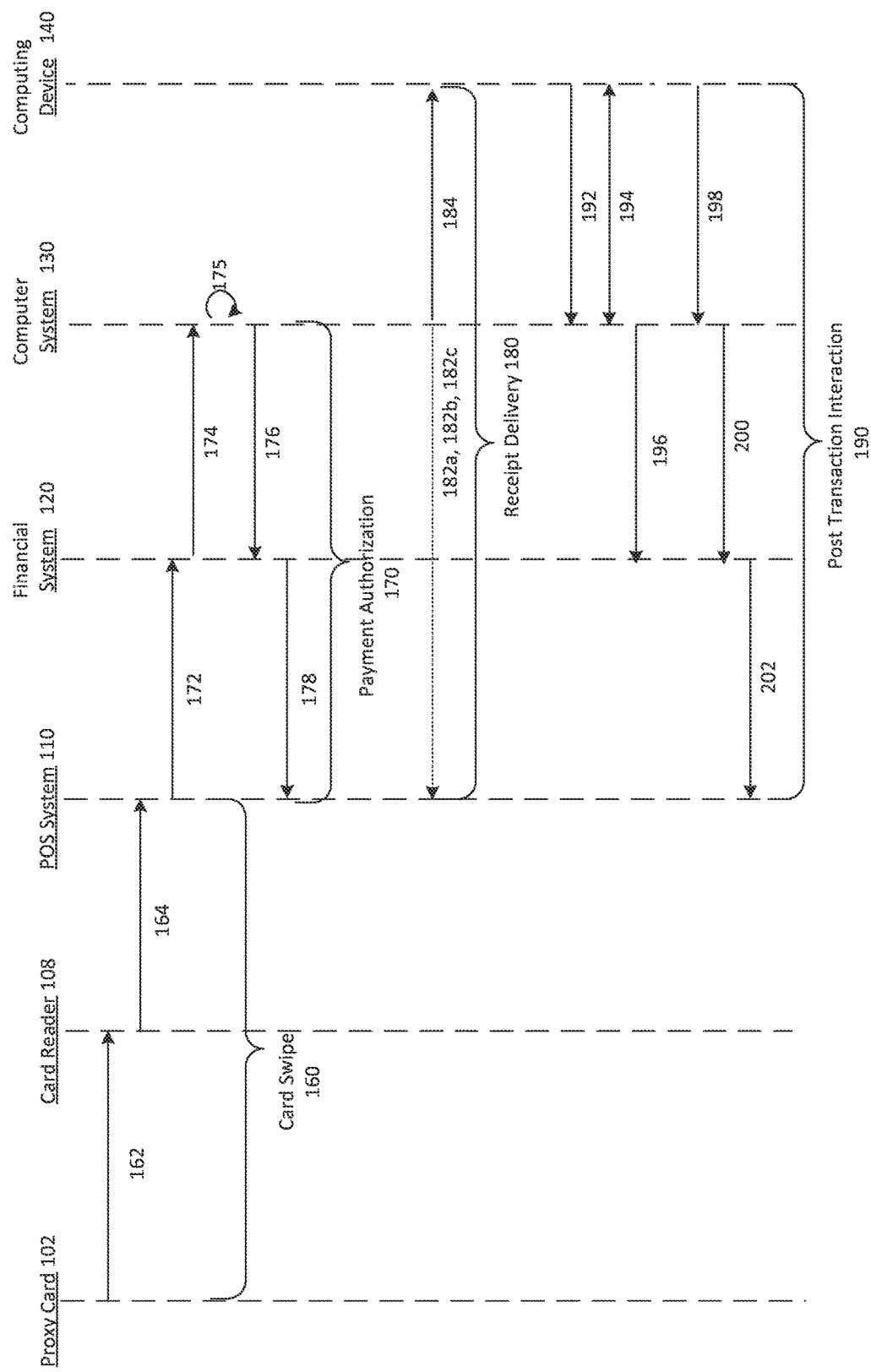
FIG. 1 illustrates a process for paying by use of a proxy card, where an interactive digital receipt is delivered in response to payment charged to a payment card account associated with the proxy card.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a technology that provides an interactive digital receipt to a consumer for a payment transaction in response to tender of payment to a merchant through the use of a payment object, where the payment object is linked to multiple payment accounts (e.g., multiple payments cards) of the consumer. The consumer automatically receives the interactive digital receipt at his/her personal computing device upon authorization of payment from a selected payment account linked to the payment object. The payment object allows the consumer to carry a single card or other object in place of multiple payment cards. The interactive digital receipt not only provides a transaction record, but also provides an interactive platform that allows the consumer to perform various actions to interact with receipt components subsequent to delivery of the receipt. The actions can include, for example, tipping, providing feedback, redeeming a promotion, tracking loyalty reward points, and reviewing receipts from other past transactions—all at later time (e.g., after arriving at home). Further, the receipt components can be configured by the merchant to accommodate business needs, such as cater to different consumers, different advertising campaigns, different times of day, the look and feel.

The financial transaction referred to herein can be, for example, a card-present point-of-sale (POS) transaction where the consumer (i.e., "customer," "buyer," "payer," or the like) makes a purchase at a store front, other "brick-and-mortar" location, or simply in the presence of a merchant (i.e., "seller," "payee," or the like), or an electronic transaction conducted over the Internet (e.g., enter card number of the proxy card using a web site). Further, the term "sale," as in point-of-sale (POS), refers in this document to any type of payment oriented transaction, including a lease or rental for example, and is not limited to an actual purchase.

The payment object is referred to herein as a "proxy object," or in the case where the proxy object is a payment card, as a "proxy card." To facilitate description, and only as an example, it is often assumed in this description that the proxy object is a proxy card. A proxy card is linked, or associated, with multiple payment accounts of the consumer (e.g., credit card accounts, automated teller machine (ATM) or debit card accounts, and/or gift card accounts). The proxy card can be, for example, a magnetic stripe card physically similar to a traditional credit card, a smartcard (i.e., a card with embedded IC chip), a card with a bar code, or a card with a QR code. The consumer can have access to all of the linked payment accounts from the proxy card, and can use the proxy card to make a payment in which funds for the payment come from any of the linked payment accounts. Hence, the consumer is relieved of the burden of having to carry multiple payment cards.

An interactive digital receipt is also referred to herein as an "interactive receipt" or a "digital receipt." An interactive receipt can be received and displayed by a mobile software application in a consumer's mobile device (e.g., a smartphone), and can be conveyed to the mobile device in an electronic mail (email) message, a text message, or any other known or convenient form of electronic message, for example. The interactive receipt is received automatically at the consumer's device after payment authorization of any one of the consumer's payment accounts linked to the proxy card and any other transaction completion steps (e.g., consumer's acknowledgement of the payment charge via, for example, a signature or a PIN). The interactive receipt includes transaction information and one or more interactive components that allow the consumer to modify the transaction (and/or interact with the merchant) subsequent to transmission of the receipt, such as adding a tip, providing feedback to the merchant, redeeming a promotion coupon, tracking loyalty reward points, or reviewing transaction records of past and present transactions. Hence, the consumer can have an improved financial transaction experience, relieved of the burden to remember where and/or how to access his/her receipt for the transaction, and able to enjoy convenient features offered by the interactive components.

Consider the following example as an illustrative use case of the technology presented here. In the example, a consumer presents a proxy card to a merchant to pay for a financial transaction, such as a payment for service/food at a restaurant. The proxy card is swiped through a card reader provided at a point-of-sale (POS) system of the merchant. In the example, the proxy card is a physical card similar to any of traditional physical payment cards. The card reader reads proxy card information from the proxy card. The term "swipe" here refers to any manner of triggering a physical card reader to read a physical card, such as passing a card through a magnetic stripe reader, smartcard reader, optical code reader, radio frequency identification (RFID) reader, etc.

After a successful swipe of the proxy card, the process of authorizing the transaction begins. Upon successful authorization of the transaction, a digital receipt is automatically sent to the consumer's mobile device (e.g., a smartphone). From the digital receipt, the consumer is able to see an electronic record of the transaction and to perform an interactive action associated with the receipt. The consumer receives the interactive receipt automatically upon payment authorization of any of the payment cards associated with the proxy card, regardless of whether or not the merchant in the transaction (i.e., the POS system) has any association with a transaction computer system or service that processes the proxy card.

The authorization process begins with the card reader transmitting the proxy card information to the POS system, to which the card reader is coupled. In some embodiments, the POS system sends the proxy card information and transaction information, such as a purchase amount and name of the merchant, to a financial system. The financial system can include a processing service, a financial service, and a banking service. The processing service receives the proxy card information and the transaction information from the POS system. The processing service determines a "type" of the proxy card from the proxy card information received. Examples of "types" of cards in this context include VISA and MasterCard branded payment cards. In one example, the proxy card information includes encoded data indicating the card as having a particular brand (e.g., VISA or MasterCard), and further includes additional meta-data signifying the card as being a "different" payment card (e.g., a VISA branded proxy card instead of a traditional VISA branded payment card). The processing service, based on the proxy card information, recognizes the "type" (e.g., brand) of the proxy card and sends the transaction information to a particular financial service that processes payment cards having that brand (e.g. VISA's VisaNet Payment System in the case of a VISA branded card).

The particular financial service, in response to detecting the meta-data included in the proxy card information, forwards the transaction information to a transaction computer system for further processing. In this example, the transaction information is forwarded to a particular transaction computer system associated with an IP address that is contained in the meta-data. The transaction computer system uses the proxy card information to access a database containing various data associated with the proxy card, such as the consumer's name and payment accounts associated with the proxy card. In some embodiments, the transaction computer system selects a payment account to use for authorizing the payment based on an algorithm, from multiple accounts of the consumer that are associated with the proxy card. The transaction computer system can make the selection based on any of various criteria, and the consumer can be given the ability to modify those criteria (e.g., via a website associated with the transaction computer system). In other embodiments, the transaction computer system selects the payment account by prompting the consumer to make a selection via the consumer's mobile device. The transaction computer system then sends the transaction information and payment account information of the selected payment account to the financial service that handles that "type" of account for further processing.

In one example, the "type" of the selected payment account is a MasterCard branded payment card. In that case, the transaction computer system sends the transaction information and the payment account information to the financial service that processes MasterCard branded payment cards (e.g. MasterCard's BankNet network). MasterCard's BankNet network determines a particular banking service associated with the payment account, and forwards the transaction information and the payment account information to that banking service for further processing. A typical banking service manages payment accounts including funds in or available to the payment accounts. As such, when the banking service receives the transaction and payment account information, it determines that the payment account has access to adequate funds for the payment, and sends an authorization for the payment to the POS system.

In some embodiments, the POS system sends the transaction information to the transaction computer system on which a financial transaction platform is implemented (instead of a financial system as discussed in the preceding example). The financial transaction platform enables multiple payers to engage in financial transactions with multiple payees including processing payments made by the payers using payment cards. The processing includes causing a transfer of funds from accounts associated with the payment cards to accounts associated with the payees. The financial transaction platform has access to the database that contains the various data associated with the proxy card. The financial transaction platform determines that the transaction information includes proxy card information, and accesses the database to select a payment account to use for authorizing the payment. Alternately, the financial transaction platform can prompt the consumer to select a payment account via the consumer's mobile device.

In such embodiments, the financial transaction platform sends the transaction information and the selected payment account information to the financial service that handles that "type" of payment account for further processing. Similar to the preceding example, the financial service forwards the transaction information to a banking service associated with the payment account, and the banking service sends an authorization for the payment to the POS system. In some embodiments, it is the financial transaction platform that sends the authorization for the payment to the POS system. In some embodiments, the financial transaction platform sends the authorization for the payment to the financial system, which relays the authorization to the POS system.

At the point that the POS system receives the payment authorization and the consumer agrees to the financial transaction, such as by providing a signature or a personal identification number (PIN), the financial transaction is complete. If the consumer does not later change the payment account selection, the financial system will transfer funds from the payment account to an account associated with the merchant to fund the payment.

Further, at this point when the financial transaction is complete, the transaction computer system delivers an interactive digital receipt associated with the transaction to the consumer at her mobile device. The interactive receipt can be generated by a digital receipt system coupled to the computer system. The consumer can then use her mobile device to access and view the interactive receipt. In one example, the consumer looks at the receipt while still sitting at the merchant's restaurant after having approved the payment card charge. In another example, the consumer looks at it again when she arrives home.

The interactive receipt is a receipt that "lives on" subsequent to its delivery to the consumer's device. In addition to providing transaction information (e.g., payment amount, item description, purchase date, etc.), the interactive receipt operates as an interactive platform. The interactive platform allows the merchant to deliver various interactive components via the receipt to the consumer. The interactive components allow the consumer to perform one or more actions, via her device, to interact with the transaction (and/or merchant) later on after the transaction has been completed. In some embodiments, the interactive receipt, including its interactive components, is configurable by the merchant. The merchant can configure the interactive receipt to cater to different consumers, different advertising campaigns, different times of day, and/or adjust the look and feel. For example, the merchant causes the interactive receipt to present certain interactive components that are reserved for the merchant's most loyal consumers, where other customers do not have such components presented on their interactive receipts.

The interactive components can include, for example, a tipping component, a feedback component, loyalty rewards record, promotion redemption, or an all-time transaction record of interactive receipts from past and present transactions conducted using the proxy card with a variety of different merchants. In some embodiments, the interactive components are time-based, where the components are configured by the merchant to be available to the consumer for a predefined time period (e.g., can leave a feedback within two days of transaction).

For example, the tipping component is configured to allow the consumer to add a tip (gratuity) on top of the payment amount within two hours of her restaurant visit. In such an example, the consumer can add the tip after approving the payment authorization at the restaurant, or can add the tip at home while reviewing the transaction details. In another example, the merchant delivers to the customer, via the interactive receipt, a promotional $10 coupon. In such example, the $10 value of the coupon decreases based on how long it has been since the consumer has completed the original transaction at the merchant's store. The value of the coupon ultimately decreases to $0 in accordance with the passage of time, and the sooner the customer redeems the coupon, the higher the value she gets.

In addition to the various features of the interactive components, the consumer has the option to change the payment account associated with the proxy card to make the payment to the merchant. In some embodiments, the option to change the payment account may be embodied in an interactive component of the interactive receipt. In an illustrative example, when the consumer gets home, she uses her mobile device (e.g., a smart phone or tablet computer) to communicate with the transaction computer system, where the consumer requests to view the transaction (e.g., payment account utilized for payment in the proxy card transaction). In one example, the consumer communicates with the transaction computer system by accessing the interactive receipt received at the consumer's mobile device and interacting with a proxy card interactive component, or "payment object interactive component" via the interactive receipt. In another example, the consumer communicates with the transaction computer system by accessing a pop-up message (e.g., notification) that appears on the consumer's mobile phone after the transaction, where the message prompts the consumer whether she wishes to change the payment account.

The transaction computer system, in response to the consumer's request, sends information regarding the consumer's recent transaction, such as the merchant, the date, and the purchase amount, to the consumer via the consumer's mobile device. The transaction computer system further sends information regarding the payment accounts that are associated with the consumer's proxy card. The information may be sent, for example, via a proxy card interactive component of the interactive receipt. The consumer, using her mobile device, selects a second payment account from which funds for the payment are to be obtained. Receiving this selection, the transaction computer system cancels the payment that was previously authorized, and, similar to the preceding examples, sends the transaction information and the second payment account information to the financial system for processing. The financial system transfers funds from the second payment account to the account associated with the merchant to fund the payment.

Other aspects and advantages of the disclosed technology will become apparent from the following description in combination with the accompanying drawings, illustrating, by way of example, the principles of the disclosed technology.

FIG. 1 illustrates a process for paying for a purchase using a proxy card, where an interactive digital receipt is delivered in response to authorization of a payment card associated with the proxy card, according to various embodiments of the disclosed technology. While the example of FIG. 1 involves paying for a purchase of goods using the proxy card, the disclosed technology can be used to make any electronic payment, including payments for the purchase of services, for rentals, for financial transactions, etc. The example process illustrated in FIG. 1 has four phases, including card swipe 160, payment authorization 170, receipt delivery 180 and post-transaction interaction 190.

The transaction illustrated in FIG. 1 starts when a buyer presents a proxy card 102 to a seller. In one example, proxy card 102 is a magnetic stripe card physically similar to a credit card. Proxy card 102 may be associated with one or more payment cards belonging to the buyer. A payment card can be, for example, a credit card, an ATM card, a debit card, a pre-paid credit card, a pre-paid debit card, a gift card, a stored value card, a fleet card, and the like.

Seller 104 initiates the financial transaction with a card swipe at step 162 by swiping proxy card 102 through a card reader 108. Card reader 108 is coupled to POS system 110. Through the swipe, card reader 108 obtains information from proxy card 102 ("proxy card information"). The proxy card information includes identifying information for the proxy card and meta-data which can be used to determine that proxy card 102 is a proxy card (as opposed to a normal credit/debit/ATM card), among other purposes. Card reader 108 sends the proxy card information at step 164 to POS system 110.

POS system 110 then begins the second phase, which is payment authorization 170. At step 172, POS system 110 transmits the proxy card information, in addition to information associated with the purchase transaction (i.e., "transaction information"), to a financial system 120 to start the payment authorization process. The transaction information includes, for example, the payment amount of the transaction, information regarding the seller, and/or individual line item descriptions from the transaction.

At step 174, upon receiving the proxy card information and the transaction information, financial system 120 parses the meta-data and determines, based on the meta-data, to send a message to transaction computer system 130. The meta-data can include data such as an IP address or a phone number that indicate where the message should be sent (e.g., to a particular transaction computer system). The message sent to transaction computer system 130 can include all or part of the proxy card information and the transaction information, among other information.

Transaction computer system 130, upon receiving the proxy card information, selects a particular payment account, from one or more payment accounts corresponding to one or more payment cards of a buyer, to use for the purchase transaction. In particular, transaction computer system 130, using the proxy card information, accesses a database to obtain payment account information associated with proxy card 102. At step 175, transaction computer system 130 applies an algorithm, which can be customized by the buyer, to select the particular payment account based on the payment account information. The algorithm can make the selection based on any of various criteria. For example, transaction computer system 130 selects an account that is a VISA branded payment card account.

At step 176, upon selecting the payment card account, transaction computer system 130 transmits the transaction information and the payment account information to financial system 120. Using the information associated with the selected payment account received from transaction computer system 130, financial system 120 determines the results of the payment authorization. If the payment account has access to adequate funds for the payment, and no other issue is identified, financial system 120 determines that the result of payment authorization is that the payment is authorized. If some issue is identified (e.g., insufficient funds, fraud alert, etc.), financial system 120 determines that the result of payment authorization is that the payment is declined. At step 178, financial system 120 then transmits the results of the payment authorization to POS system 110. In some embodiments, transaction computer system 130, instead of financial system 120, determines and sends the results of the payment authorization to POS system 110.

At this point, assuming that the purchase transaction was authorized and the consumer accepted the purchase transaction, the purchase transaction is complete, and phase three receipt delivery 180 begins. In some embodiments, the buyer's acceptance of the purchase transaction may involve obtaining a signature or a PIN from buyer (as approval of the authorization) to complete the transaction. This may include, for example, transaction computer system causing a user interface to be generated on a display of POS system 110 to prompt for inputs from the buyer, as indicated by step 182a. In some embodiments, the buyer's acceptance of the purchase transaction involves transaction computer system 130 causing an image of a receipt to be generated on a user interface of the display of POS system 110, and prompting the buyer to provide an electronic signature to sign the receipt image, as indicated by step 182b. In some embodiments, the buyer's acceptance of the purchase transaction includes prompting the buyer to select whether she wishes to obtain an electronic receipt for the transaction. This may be implemented, for example, by transaction computer system 130 causing a user interface to be generated on a display of POS system 110, as indicated by step 182c. In some embodiments, the buyer's acceptance of the purchase transaction includes causing an interactive receipt 150 indicative of the transaction to be generated and transmitted to a personal computing device 140 of the buyer, as indicated by step 184. Interactive receipt 150 can be in the form of a text message, an email, or a mobile application.

In some embodiments, transaction computer system 130 causes interactive receipt 150 to be sent to the consumer based on an association of the personal computing device with proxy card 102. In such embodiments, when transaction computer system 230 receives an indication of the transaction (e.g., receives payment authorization and/or consumer's transaction approval), computer system 130 identifies a personal computing device associated with proxy card 102. For example, the card number of proxy card 102 is associated with a mobile number of the consumer's mobile phone. In such example, whenever the consumer uses proxy card 102, transaction computer system 130 automatically generates and sends a digital receipt to the consumer's mobile phone having the associated mobile number.

At step 184, a digital receipt system, coupled to transaction computer system 130, generates an interactive receipt in response to successful payment authorization and final approval of buyer of the payment charge. As discussed above, the authorization occurs when payment is authorized by a particular payment account of a payment card linked to proxy card 102. In some embodiments, digital receipt system is a standalone computer system in communication with transaction computer system 130 and POS system 110. In some embodiments, digital receipt system is a part of transaction computer system 130. For example, when POS system 110 receives payment authorization and a submission from buyer 110 to close out the transaction, POS system 110 sends an indication to transaction computer system 130 of such occurrence (i.e., completed transaction). Transaction computer system 130, coupled to digital receipt system, causes generation and delivery of a digital receipt to personal computing device 140. The digital receipt can be displayed, for example, on a portion or an entirety of a display screen of personal computing device 140.

The digital receipt includes transaction information indicative of the financial transaction. The digital receipt can also include one or more interactive components to allow buyer to interact with various features associated with the financial transaction, subsequent to completion of that transaction (and to delivery of the receipt). The transaction information can include, for example, a list of purchased items and corresponding prices. The transaction information can be displayed in a "transaction component" on the display screen of device 140 to include transaction details. Interactive components can be generated and made available to the buyer within a predefined time period subsequent to receipt delivery at computing device 140. The predefined time period is configurable by seller and allows seller to provide time-based incentives to engage buyer. Further details regarding the interactive components and the transaction component will be discussed in FIGS. 4A and 4B.

Phase four post-transaction interaction 190 is an optional process provided by the disclosed technology at which buyer is able to perform various actions associated with the financial transaction at a later time. In phase four 190, buyer is able to change payment accounts from which funds are transferred to pay for the transaction and able to interact with various features associated with the transaction via the interactive receipt. If the buyer does not utilize this phase to change payment accounts, financial system 120 will transfer funds for the payment from the selected payment account to an account associated with the seller.

Consider an illustrative example when buyer arrives at home after completing the financial transaction, where buyer decides to complete two things: (1) change payment account from which funds are to be obtained to pay the purchase; and (2) to leave a tip for seller.

The buyer uses personal computing device 140 (e.g., an iPad) to initiate the payment account change which includes steps 192, 194, and 196. At step 192, personal computing device 140 communicates with transaction computer system 130 to initiate the change. At step 194, transaction computer system 130 provides information regarding the purchase transaction to the consumer via personal computing device 140. In some embodiments, the information regarding the purchase transaction is provided via the digital receipt. In one example, the information is provided via an interactive component of the digital receipt. In another example, the information is provided within the body of a text message, where the receipt is in the form of the text message. Examples of the information provided include the date of the purchase, information regarding the seller, and the amount of the purchase. Transaction computer system 130 further provides information regarding the payment accounts associated with proxy card 102 to the buyer via personal computing device 140. Transaction computer system 130 has access to a database containing various information associated with proxy card 102, as well as associated with buyer and the payment accounts associated with proxy card 102.

When there are multiple payment accounts associated with proxy card 102, buyer, using personal computing device 140, can select any payment account associated with proxy card 102 from which funds for the payment are to be obtained. At step 194, personal computing device 140 transmits information indicating the selection to computer system 130. After the selection is made, at step 196 transaction computer system 130 transmits information related to the selection, such as identifying information for the selected payment account, to financial system 120, which causes financial system 120 to obtain funds for the purchase from the selected payment account. Transaction computer system 130 additionally prevents the funds to be obtained from the initially selected payment account, such as by canceling the payment authorization initially obtained from the initially selected payment account.

Buyer next uses personal computing device 140 to submit a gratuity amount, or tip amount, on top of the purchase payment, as indicated in step 198. Buyer submits an amount using a tipping interactive component of interactive receipt, where the amount is transmitted to transaction computer system 130. Transaction computer system 130 sends the tip amount to financial system 120. Financial system 120, which has granted payment authorization for the purchase amount, adds the tip amount to the authorization. Financial system 120 then sends the amount to POS system 110, informing POS system 110 the tip amount added by buyer.

Figure 2:
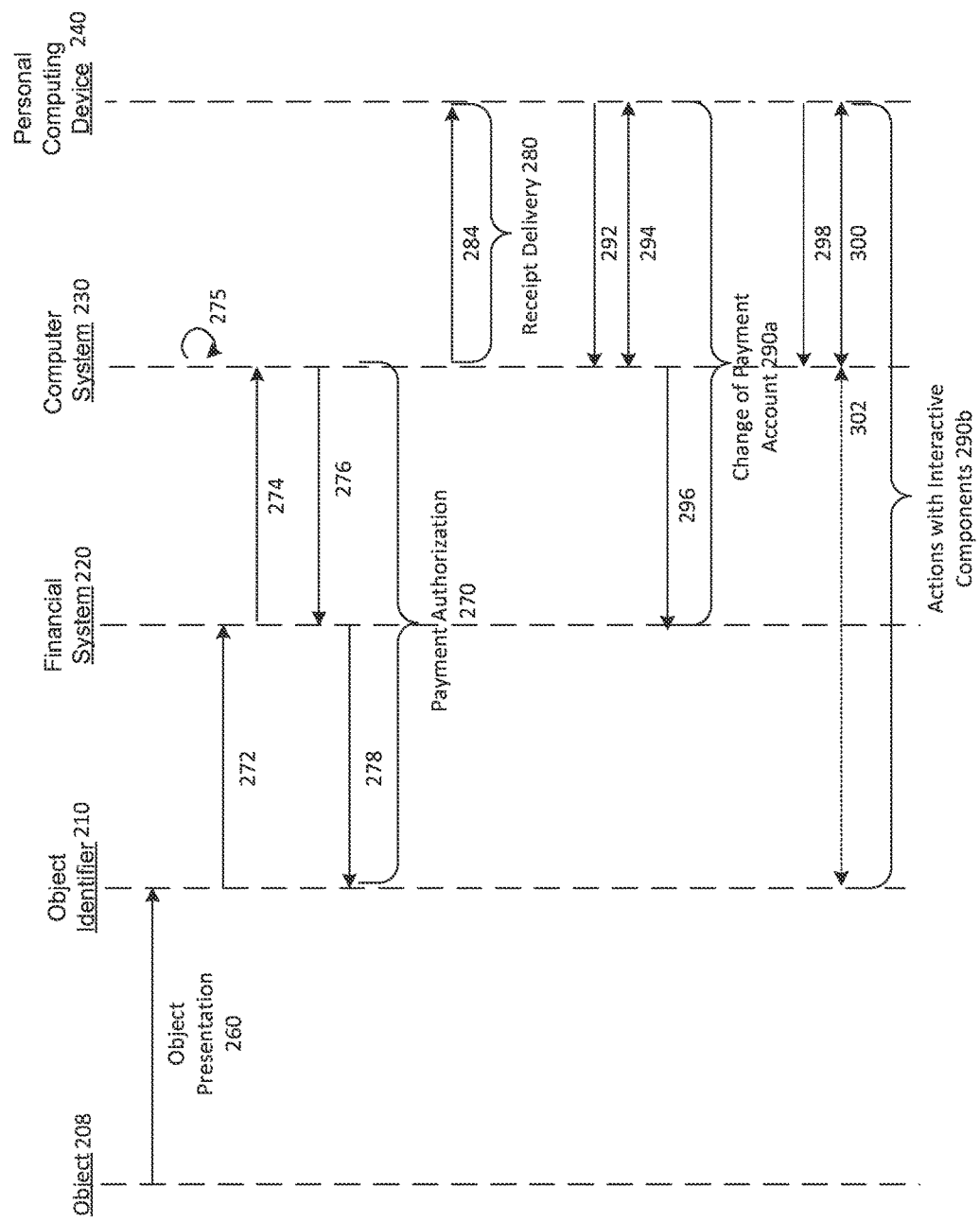
FIG. 2 illustrates a process for paying by use of a payment object, where an interactive receipt is generated in response to payment charged to a financial account associated with payment object.

FIG. 2 is an illustration of a process for paying for a purchase using a payment object, where an interactive receipt is generated in response to payment authorization associated with payment object, in accordance with various aspects of the disclosed technology. In the example illustrated in FIG. 2, the purchase process has four phases.

The first phase is object presentation 260. A consumer has object 208, which is referred to herein as both a proxy object as well as a payment object. Object 208 has associated payment accounts, and can be a proxy card with associated payment accounts. The consumer presents object 208 to the merchant to pay for a purchase. Because object 208 is compatible with financial system 220, object 208 can be presented to the merchant in a way which enables the merchant to obtain information related to object 208 sufficient to enable initiation of payment authorization 270, which is phase two.

As a first example, object 208 can be proxy card 102 of FIG. 1. Object presentation 260 includes presenting the proxy card so that the proxy card can be read by object identifier 210. In this example, object identifier 210 is a POS system including a card reader in which the card reader is able to obtain information associated with object 208 (i.e. the proxy card) sufficient to initiate payment authorization 270. As a second example, object 208 can be a finger. Object presentation 260 can be, for example, presenting the finger so that the fingerprint of the finger can be read by object identifier 210. In this second example, object identifier is a biometric finger scanner capable of obtaining information related to object 208 (i.e. the finger) sufficient to enable initiation of payment authorization 230.

Object identifier 210 begins the second phase, which is payment authorization 270 and includes steps 272, 274, 276, 277, and 278. Payment authorization 270 includes the steps for obtaining authorization for the payment related to the purchase transaction. Payment authorization 270 starts with step 272. At step 272, object identifier 210 obtains object information associated with object 208. For example, a POS system obtains proxy card information from the magnetic stripe of the proxy card. Step 272 continues with the transmission of the object information to financial system 220. For example, the POS system transmits the proxy card information to financial system 220. Information related to the purchase transaction (i.e. the transaction information), such as the amount of the purchase, is also transmitted to financial system 220.

Object identifier 210 can be, for example, a card reader which transmits the object information and the transaction information to financial system 220. Financial system 220 receives the transmitted information, and based on this information, decides to relay the transmitted information to transaction computer system 130 for further processing. At step 274, financial system 220 relays the transmitted information, along with other information, to transaction computer system 230.

For example, financial system 220 receives the transmitted proxy card information, which includes meta-data, and the purchase amount. Upon receiving the proxy card information, and based on the proxy card information, financial system 220 decides to relay the transmitted information to transaction computer system 230. At this point in time, financial system 220 does not have the information needed to complete or authorize the purchase transaction, as financial system 220 without transaction computer system 230 is not able to determine a payment account associated with the proxy card to use for the purchase transaction.

Transaction computer system 230, upon receiving the proxy card information, accesses a database access to obtain payment account information associated with the proxy card information. At step 275, transaction computer system 230 applies an algorithm, which can be customized by the consumer, to select the payment account to use for the purchase transaction. The following are examples of algorithms, or policies, which can additionally be used for step 175 of FIG. 1

1) When there are multiple payment accounts associated with object 208 and until changed by the consumer or some other entity, the same (single) payment account is used for all payment made using object 208.
2) The payment account used can be different for each purchase transaction as well for each line item of a purchase transaction based on a payment account selection algorithm.

For example, a consumer can use a proxy card to purchase gas and a snack item at a gas station as part of a single purchase transaction. For this purchase transaction, the payment account selection algorithm can select a gas credit card associated with the proxy card for the gas line item, and can select a VISA credit card associated with the proxy card for the snack line item. In some embodiments, the consumer can set, modify, or change the algorithm for selecting the payment account to use for a purchase transaction. In some embodiments, the algorithm is based on inputs received from the consumer.

At step 276, transaction computer system 230 transmits the transaction information and the payment account information to financial system 220, and financial system 220 determines the results of payment authorization 270 using the selected payment account. If the payment account has access to adequate funds for the payment, and no other issue exists, financial system 220 determines that the result of payment authorization 270 is that the payment is authorized.

If some issue exists, such as the payment account does not have access to adequate funds for the payment or the payment account has a fraud alert, financial system 220 determines that the result of payment authorization 270 is that the payment is declined. Other results, such as declining the purchase transaction and instructing the merchant to take possession of the proxy card, or additional information, such as an authorization number, can be transmitted to financial system 220 at step 276. At step 278, financial system 220 transmits the results of payment authorization 270 to object identifier 210.

In some embodiments, instead of financial system 220 determining and sending the results of payment authorization 270, transaction computer system 230 determines and sends the results of the payment authorization. Transaction computer system 230 decides the payment authorization based on information such as the consumer's credit reports or scores and the history of past payments processed by transaction computer system 230. Transaction computer system 230 can send the payment authorization results to object identifier 210, or can send the results to financial system 220, which can relay the results to object identifier 210.

At this point, assuming that the purchase transaction was authorized and the consumer accepted the purchase transaction, the purchase transaction is complete, and phase three receipt delivery 280 begins. At step 284, a digital receipt system, coupled to transaction computer system 230, generates a digital receipt in response to successful payment authorization and final approval from the consumer of the payment charge associated with the proxy object, such as a proxy payment card).

In some embodiments, the digital receipt system is a standalone computer system in communication with transaction computer system 230 and object identifier 210. In some embodiments, the digital receipt system is a part of transaction computer system 230. For example, when object identifier 210 receives payment authorization and a submission from consumer to close out the transaction, object identifier 210 sends an indication to transaction computer system 230 of such occurrence (i.e., completed transaction). Transaction computer system 230, coupled to the digital receipt system, causes generation and delivery of the digital receipt to personal computing device 240. The digital receipt can be displayed, for example, on a portion or an entirety of a display screen of personal computing device 240. The digital receipt can be in the form of a text message, an email, or a mobile application. The digital receipt includes transaction information associated with the transaction between the consumer and the merchant. In some embodiments, the digital receipt includes one or more interactive components to allow the consumer to interact with various features associated with the financial transaction, subsequent to completion of that transaction (and to delivery of the receipt).

Phase four post-transaction interaction 290 is an optional process provided by the disclosed technology at which consumer is able to perform various actions associated with the financial transaction at a later time. In phase four 290, consumer is able to change payment accounts from which funds are transferred to pay for the transaction and able to interact with various interactive components associated with the transaction via the interactive receipt.

Consider an illustrative example in which the consumer arrives at home after completing the financial transaction, where consumer decides to complete two things: (1) change payment account from which funds are to be obtained to pay the purchase; and (2) to leave feedback for merchant. It is noted that if the consumer does not utilize this phase to change payment accounts, financial system 220 will transfer funds for the payment from the selected payment account to an account associated with the merchant.

The consumer uses personal computing device 240 (e.g., an iPad) to initiate the payment account change which includes steps 292, 294, and 296. At step 292, personal computing device 240 communicates with transaction computer system 230 to initiate change of payment account 290*a*. At step 294, transaction computer system 230 provides information regarding the purchase transaction to the consumer via personal computing device 240. Examples of the information provided include the date of the purchase, information regarding the merchant, and the amount of the purchase. Transaction computer system 230 further provides information regarding the payment accounts associated with object 208 to the consumer via personal computing device 240. Transaction computer system 230 has access to a database containing various information associated with object 208 as well as associated with the consumer and the payment accounts associated with object 208.

When there are multiple payment accounts associated with object 208, the consumer, using personal computing device 240, can select any payment account associated with object 208 from which funds for the payment are to be obtained. At step 294, personal computing device 240 transmits information indicating the selection to transaction computer system 230. After the selection is made, at step 296 transaction computer system 230 transmits information related to the selection, such as payment account information, to financial system 220. This causes financial system 220 to obtain funds for the payment from the selected payment account. Transaction computer system 230 additionally prevents the funds from being obtained from the initially selected payment account, such as by canceling the payment from the initially selected payment account. The funds can correspond to the amount of the purchase, the amount of a line item, the amount of multiple line items, or some other amount corresponding to the purchase, and can be transferred to an account associated with the merchant. The funds transferred can correspond to an amount by being for the amount less a transaction fee. Further, purchase transactions can be batched, and the funds can be for an amount corresponding to the amount of the batch of purchase transactions.

Using personal computing device 240, consumer next performs various actions to interact with various features offered through the interactive receipt, which is automatically received at the device 240 upon successful payment authorization and approval from consumer. Consumer's interactions are sent to payment mechanism 230 at step 298. The various interactions may be ongoing as requests and responses between computer system 230 and computing device 240 subsequent to the transaction, as indicated in step 300. In one example, consumer leaves a feedback for the merchant using a feedback component offered via the interactive receipt. In another example, consumer redeems a promotional reward offered by the merchant via a promotion component of the interactive receipt. In yet another example, consumer submits a tip for service rendered by merchant in the completed transaction. Depending on the interactions, transaction computer system 240 may communicate with financial system 220 and object identifier 210 to carry out consumer's requests.

Now turning to object 208. In various embodiments, object 208 can be a magnetic stripe card, a smart card, a proximity card, a re-programmable magnetic stripe card, an card containing an optical code such as a quick response (QR) code or a bar code, or a biometrically identifiable object, such as a finger, a hand, an iris, or a face, among others. Object 208 can be associated with various payment objects and payment object accounts, including accounts associated with credit cards, ATM cards, debit cards, pre-paid credit cards, pre-paid debit cards, gift cards, and fleet cards, among others. The payment accounts can be associated with object 208 by, for example, being linked to object 208. The link can be implemented, for example, using a database which links object 208 with the payment accounts. Further, object 208 can be associated with loyalty programs, wherein the loyalty programs are another type of payment account which can be used to make the purchase. In some embodiments, object 208 can be a mobile device. Examples of mobile devices include smart phones, tablets, portable media devices, wearable devices, laptops, and other portable computers.

Object identifier 210 can obtain information associated with object 208, the information being part of the object information. In embodiments where object 208 is a magnetic stripe card or a re-programmable magnetic stripe card, object identifier 210 can read the magnetic stripe. In embodiments where object 208 is a smart card, object identifier 210 can communicate with the smart card to obtain information related to object 208. In embodiments where object 208 is a proximity card, object identifier 210 can cause the proximity card to transmit information associated with the proximity card, such as a radio frequency identification (RFID), which object identifier 210 can receive. In embodiments where object 208 is a card with an optical code such as a QR code or bar code, object identifier 210 can obtain the optical code, for example, by scanning the optical code. Object identifier 210 can further transmit the object information to financial system 220.

Object identifier 210 can further include a sales system, such as POS system 110 of FIG. 1. Examples of sales systems include point-of-sale (POS) systems, cash registers, computer systems running sales applications including mobile devices running sales applications, cloud based POS systems, checkout registers, computer systems running internet based applications such as a web browser, and the like.

In embodiments where object 208 is a biometrically identifiable object, such as a finger, a hand, an iris, or a face, object identifier 210 can identify the biometrically identifiable object or can obtain information from the biometrically identifiable object and can transmit that information to a computer system that can use the information to identify the biometrically identifiable object. For example, when the biometrically identifiable object is a finger, object identifier 210 can obtain data related to the fingerprint of the finger. In some embodiments, object identifier 210 can recognize the fingerprint to identify the finger (e.g. this is the finger of Jane Doe). For example, object identifier 210 can include a biometric scanner coupled to a computer system such as a POS system, wherein the biometric scanner can scan the consumer's fingerprint, can transmit the biometric scan results to the computer system to which the biometric scanner is coupled, and the computer system can use the consumer's fingerprint to identify the finger. In other embodiments, object identifier 210 can transmit the data related to the fingerprint to a second computer system, for example, to a compute server associated with the merchant, to financial system 220, to transaction computer system 230, or to another computer system, and the second computer system can use the transmitted fingerprint data to identify the finger. The second computer system can transmit identifying information associated with the finger to object identifier 210, the identifying information being part of the object information. Object identifier 210 can further transmit the object information to financial system 220.

In embodiments where object 208 is a mobile device, object identifier 210 can obtain identifying information associated with the mobile device. In one example where object 208 is a smart phone, object identifier 210 can communicate with the smart phone via 3G to obtain identifying information related to a digital wallet associated with the smart phone, the identifying information being part of the object information. Object identifier 210 in various embodiments can communicate with the mobile device via WiFi, 3G, 4G, Near Field Communication (NFC), or Bluetooth, or can obtain an optical code such as a QR code or a bar code or any machine readable code from the mobile device, for example, by scanning an optical code displayed by the mobile device. Object identifier 210 can further transmit the object information to financial system 220.

Object 208 can be associated with multiple payment accounts, and a loyalty program can be a payment account. In some embodiments, the loyalty program can be managed on behalf of the consumer via a loyalty rewards interactive component offered through the interactive receipt received at the consumer's personal computing device 240. Maintaining and offering the loyalty rewards interactive component, a merchant is able to customize offers that would incentivize certain behaviors in customers, i.e., to engage them in interacting more with the merchant via the interactive receipt.

For example, the merchant may want the consumer to return to the merchant's store, or to purchase a certain item, or to return to the store during at a certain time or during a certain time window and make a purchase. To incentivize behaviors such as these, a merchant can participate in or offer a loyalty program. The merchant can provide loyalty points or some equivalent for each purchase made by a consumer. By coming back to the merchant's store and making additional purchases, the consumer can grow the loyalty points. The loyalty points can be redeemed for purchases made at the merchant's store or another of the merchant's stores or with other businesses that participate in the loyalty program.

In addition to incentivizing loyalty to a store or a brand by providing loyalty points for purchases made at the store or for brand products, a merchant can use the loyalty program to incentivize other behaviors. For example, if the store has a slow period, such as a coffee shop is slow between 3 pm and 4 pm, the store owner can, in order to incentivize consumers to make purchases at the store during this slow time, offer increased loyalty points for purchases made between 3 pm and 4 pm at the store. The store owner can also offer increased redemption value for a consumer's loyalty points, or can lower the cost of products or services in terms of loyalty points, during this time window. For example, the store owner could offer to redeem 100 loyalty points and provide 150 points of value, or could reduce an item that normally costs 150 loyalty points to 100 loyalty points, for purchases made between 3 pm and 4 pm. As another example, if a business owner wants to incentivize consumers to purchase a new item the business owner is introducing, the business owner can offer increased loyalty points to consumers for purchasing this new item. The business owner can also offer increased loyalty point redemption value or reduced loyalty point costs to a consumer for purchasing this new item using loyalty program points. For example, if the new item can be normally purchased with 150 loyalty points, the business owner can offer 150 points of loyalty program value for 100 redeemed loyalty points to a consumer for purchasing this new item, or the business owner can reduce the cost of the new item to 100 loyalty points.

Figure 3A:
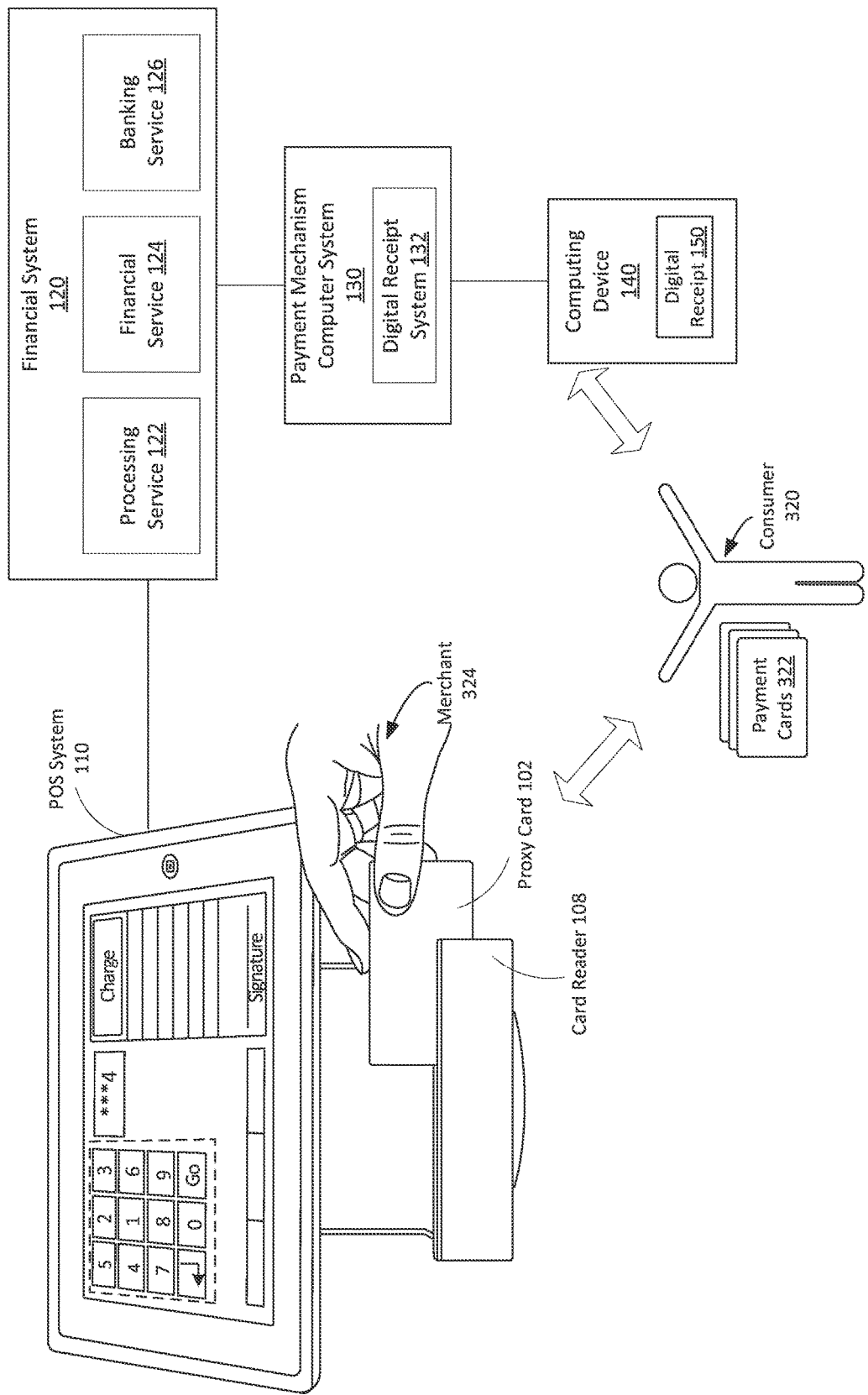
FIG. 3A illustrates a subset of components of or associated with a payment processing system for processing financial transactions and associated fund transfers and for delivering digital receipts indicative of the transactions.

FIG. 3A is an illustration of a subset of components of or associated with a payment processing system for processing purchase transactions and associated fund transfers and for delivering interactive digital receipts indicative of the transactions, according to various embodiments of the disclosed technology. The following description of FIG. 3 will be described using the transaction illustrated in FIG. 1, and will refer to labels of that figure. The following description of FIG. 3A also applies to FIG. 3B, except where differences are noted.

Figure 3B:
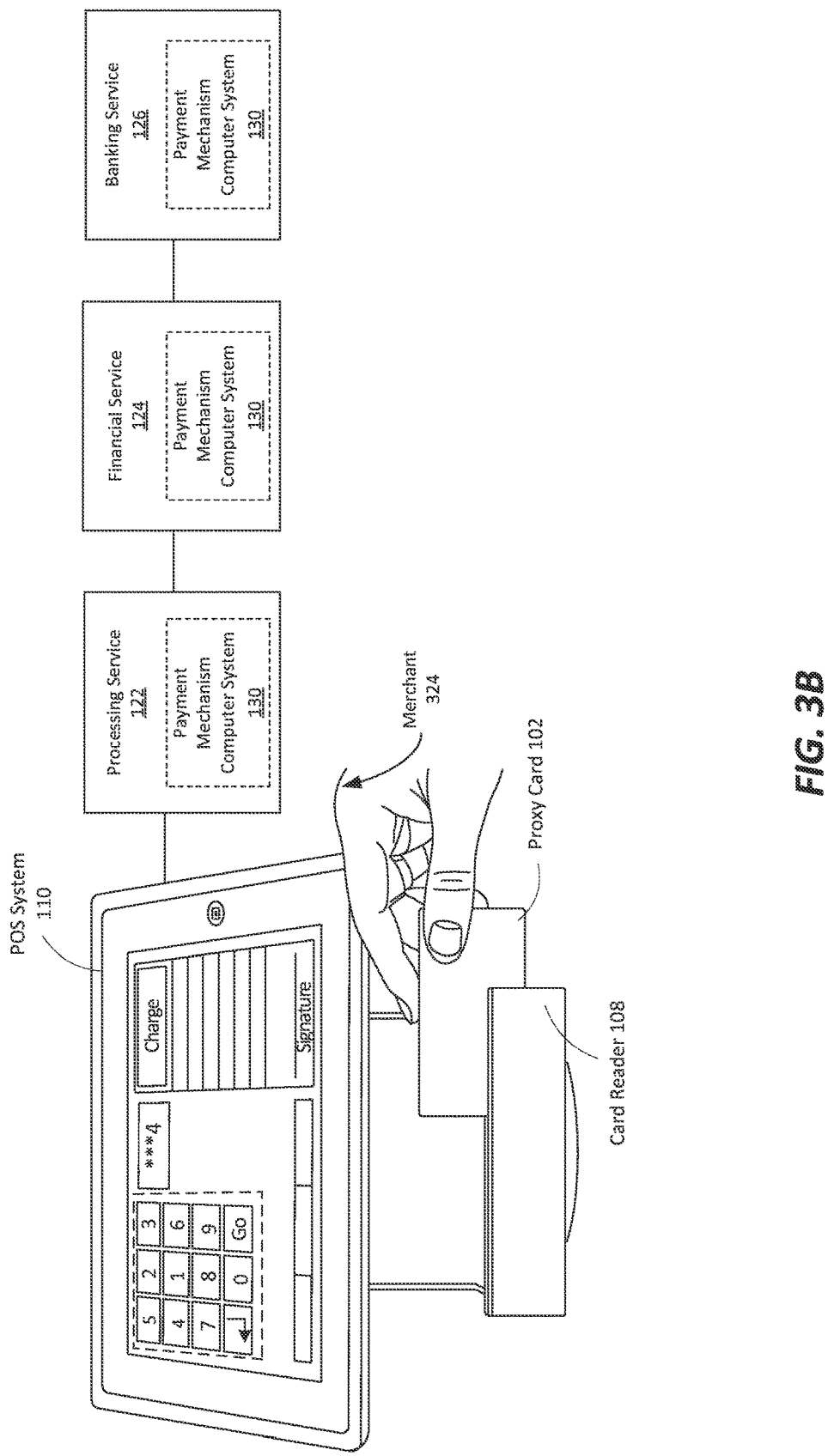
FIG. 3B illustrates a subset of components of or associated with another embodiment of a financial system for processing financial transactions and associated fund transfers.

In the embodiment of FIG. 3A, financial system 120 includes processing service 320, financial service 330, and banking service 126. In some embodiments, financial system 120 can include transaction computer system 170, such as in the embodiment of FIG. 3B. FIG. 3B is an illustration of components of or associated respectively with another embodiment of a payment processing system. In the embodiment of FIG. 3B, transaction computer system 130 is under the control of banking service 126. In another embodiment, transaction computer system 130 is under the control of financial service 124. In another embodiment, transaction computer system 130 is under the control of processing service 122.

The transaction of this example starts when a consumer 300 presents proxy card 102 to merchant 310, the proxy card being a magnetic stripe card similar to a credit card. Merchant 310 initiates card swipe by swiping proxy card 102 through card reader 108. Card reader 108 then sends the information obtained from proxy card 102, the proxy card information, to POS system 110. Card reader 108 is coupled to POS system 110. Payment authorization 130 starts when POS system 110 transmits the proxy card information to financial system 120. In the example of FIG. 1, proxy card 102 is encoded as a VISA branded payment card.

POS system 110 transmits the proxy card information to financial system 120, where the proxy card information is received by processing service 122. An example of processing service 122 is Bank of America Merchant Services. Processing service 122, based on the received proxy card information, determines that proxy card 102 is encoded as a VISA branded payment card. Based on this determination, processing service 122 relays the received information to the financial service that processes VISA branded payment cards. In this example, financial service 124 is VISA's VisaNet Payment System, which processes payments made using VISA branded payment cards.

The proxy card information includes meta-data which financial service 124 uses to determine to transmit the proxy card and transaction information to transaction computer system 130. As illustrated in FIG. 3B, in various embodiments transaction computer system 130 can be under the control of a processing service, a financial service, or a banking service. Financial service 124, upon determining to transmit information associated with proxy card 102 to transaction computer system 130, transmits information associated with proxy card 102 to transaction computer system 130.

Transaction computer system 130 selects the payment account to use for the purchase transaction, which in this example is also a VISA branded payment card account. Transaction computer system 130 sends the transaction information and the payment account information to financial system 120. In the embodiment of FIG. 3A, this includes sending the transaction and payment account information to financial service 124. Transaction computer system 130 sends the transaction and payment account information to financial service 124 based on a determination that the selected payment account is a VISA branded payment account, and based on a determination that financial service 124 is the financial service that processes payments made using VISA branded payment cards.

Transaction computer system 130 can send the transaction and payment account information to different financial services when payments from the selected payment account are processed by other financial services. Financial service 124 determines that the payment account is managed by banking service 126, and sends the transaction and payment account information to banking service 126. An example of a banking service is Chase Bank. Banking service 126 determines the result of payment authorization, and sends the results of the authorization to POS system 110.

At this point, assuming that the purchase transaction was authorized and the consumer accepted the purchase transaction, the purchase transaction is complete. Upon completion of the transaction, a digital receipt system 132, coupled to transaction computer system 130, generates and causes an interactive digital receipt, or digital receipt 150, to be delivered to computing device 140 of consumer 320. At a later time, for example when the consumer arrives at home, the consumer can optionally perform various actions associated with the transaction via the digital receipt 150. The various actions, or interactions, performed via the digital receipt include, for example: changing the payment account (associated with payment cards 322) from which funds are obtained to make the payment for the transaction; add a tip amount in addition to payment amount authorized for the transaction; leave a feedback for the merchant 324; redeem a promotion reward offered by the merchant via the digital receipt 160; review loyalty reward points with the merchant 324; and/or review all digital receipts from the merchant 324 (and other merchants from other transactions conducted).

If the consumer utilizes change of payment account, then transaction computer system 130 sends the second payment account information and the transaction information to financial system 120. In some embodiments, sending the information to financial system 120 includes sending the transaction and payment account information to financial service 124. In some embodiments, sending the information to financial system 120 includes sending the transaction and payment account information to processing service 122, where processing service 122 makes a determination to send the transaction and payment account information to financial service 124.

Returning to the description of FIG. 3A, financial service 124 determines that the payment account of this example is managed by banking service 126, and sends the transaction and payment account information to banking service 126. For other payment accounts, financial service 124 may determine that a different bank manages that payment account. Financial service 124 can send the transaction and payment account information to another banking service. Banking service 126 determines the result of payment authorization, and sends the result to transaction computer system 130. Upon receipt of the authorization, transaction computer system 130 ensures that funds for the payment will not be taken from the payment account initially used for the payment. This can be done, for example, by canceling the payment authorization of the previous payment account. As a result of change of payment account, funds for the payment will be transferred from the second payment account to the account associated with the merchant, and the initial payment account will not contribute any funds for the payment.

In some embodiments, causing the transfer includes transaction computer system 130 sending the transaction and payment account information to processing service 122. As discussed previously, processing service 122 determines to send the transaction and payment account information to financial service 124. Financial service 124 performs from this point as previously described.

Figure 4A:
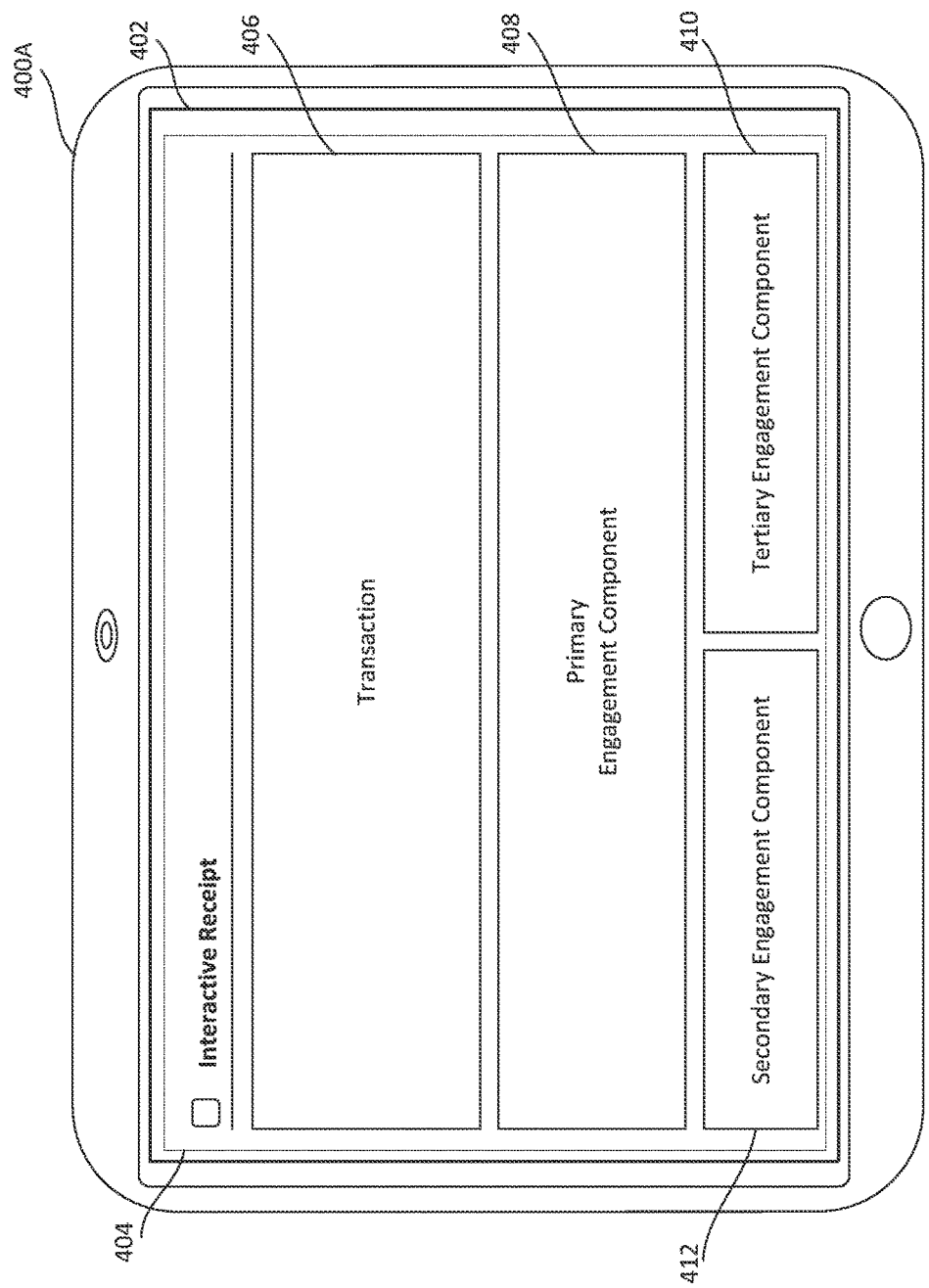
FIG. 4A illustrates a first embodiment of an interactive digital receipt implemented on a personal computing device.

FIG. 4A illustrate a first embodiment of an interactive digital receipt implemented on a personal computing device 400A. A personal computing device can be a smartphone (e.g., iPhone®, Android®-enabled phone, etc.), a personal digital assistant (PDA), a tablet, an e-reader, or other mobile or portable computing devices, a desktop, a laptop, or other wired and wireless personal computers. In the embodiment of FIG. 4A, computing device 400A is an iPad®. Computing device 400A is equipped with a display screen 402 for displaying various user interfaces to enable a user (e.g., customer) to interact with content generated on the computing device 400A.

Computing device 400A can implement an application, such as an interactive receipt mobile application for use by a mobile user, where the interactive receipt mobile application includes one or more customer interface components of interactive digital receipt 404. As used herein, the term "customer interactive component" refers to a component of a user interface intended for a customer to view and interact (e.g., submit inputs) with various features offered via interactive digital receipt 404. Interactive digital receipt 404 includes information indicative of the financial transaction, such as transaction information (e.g., payment amount and item description), and various features that allow the customer to perform action associated with the transaction, subsequent to delivery of the receipt to the customer. While interactive digital receipt 404 is embodied in a mobile application according to the embodiment of FIGS. 4A-4B, other embodiments of the receipt are possible in light of the disclosure herein. In some embodiments, interactive digital receipt 404 is embodied in a text message that can be received at a computing device (e.g., devices 400A, 400B). In some embodiment, interactive digital receipt 404 is embodied in an email message that can be received at the computing device.

In some embodiments, transaction computer system 130 generates interactive digital receipt 404 for a customer after completion of a financial transaction between the customer and a merchant (e.g., payment authorization and approval that occurs at the completion of a service and/or tendering of goods). Transaction computer system 130 then delivers receipt 404 to the customer at the customer's computing device 400A. In some embodiments, the transaction computer system 130 includes a digital receipt system 132 that carries out the functionalities associated with implementing receipt 404.

Interactive digital receipt 404 is received and displayed on display screen 402 of the computing device 400A. Interactive digital receipt 404 may take up an entirety or any portion of display screen 402. Interactive digital receipt 404 can include various content offered to the customer. In the embodiment of FIG. 4A, interactive digital receipt 404 includes a transaction component 406 and one or more interactive components 408, 410, 412. The transaction component 406 displays details associated with a particular transaction between the customer and the merchant, where the transaction details are displayed in real time in response to an occurrence of the particular transaction (e.g., payment transaction at the completion of a service). The interactive components 408, 410, 412 display one or more features for the customer to interact or perform an action associated with the transaction. In some embodiments, the features are generated so as to be available via the interactive digital receipt 404 only within a predefined time period. The predefined time period is configurable by the merchant and allows the merchant to provide time-based incentives to engage the customer.

The interactive components and general look and feel of interactive digital receipt 404 can be configured according to a particular merchant's needs. For example, a merchant in the business of selling household supplies can configure the interactive digital receipt to generate a feedback component without generating a tipping component. In another example, a merchant in the business of operating a restaurant can choose to have both the tipping and the feedback components be generated in the interactive digital receipt 404. One of ordinary skill in the art will appreciate that other configurations and components are possible.

Figure 4B:
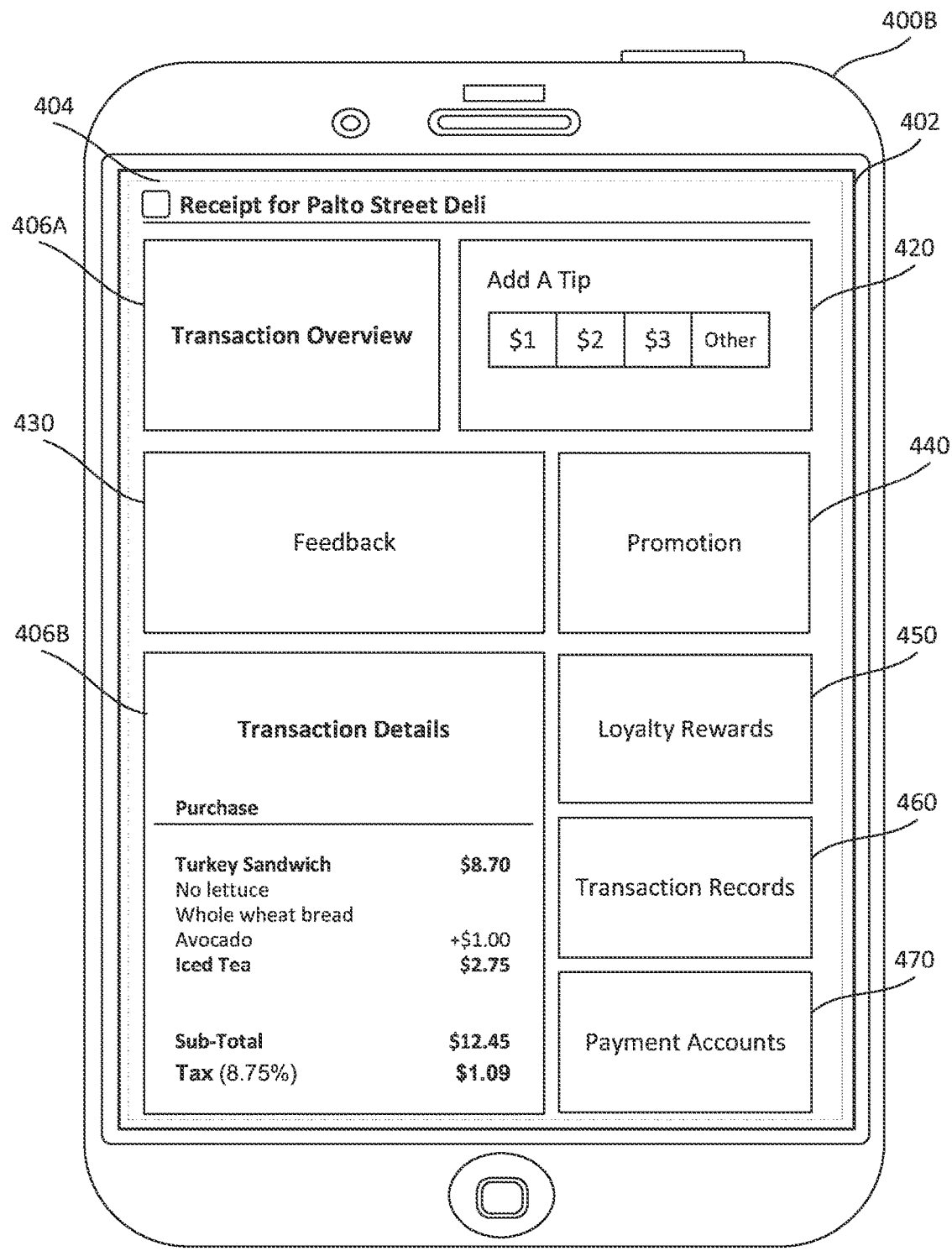
FIG. 4B illustrates a second embodiment of an interactive digital receipt implemented on a personal computing device.

FIG. 4B illustrates a second embodiment of an interactive digital receipt implemented on a personal computing device 400B. According to the embodiment of FIG. 4B, the computing device 400B is a smartphone. In FIG. 4B, interactive digital receipt 404 includes transaction components 406A, 406B, an interactive tipping component 420, an interactive feedback component 430, an interactive promotion component 440, an interactive loyalty rewards component 450, an interactive transaction records component 460, and an interactive payment accounts component 470.

Transaction components 406A, 406B provide transaction information associated with the transaction. Transaction component 406A includes an overview of the transaction completed between the customer and the merchant, such as the total amount of the transaction, the payment card used for the transaction (e.g., proxy card name or last four digits of a payment card associated with the proxy card), the date, among others. Transaction component 406B includes details of the transaction, such as the name of the items purchased, the quantity, the price, among others.

Interactive tipping component 420 (or, "tipping component") allows the customer to submit a gratuity amount, or tip amount, at a later time, i.e., subsequent to completion of a financial transaction. An example transaction, for example, is payment for a meal, where the customer can leave a tip after she has left the restaurant using interactive digital receipt 404 on her computing device 400B, which has been delivered to device 400B automatically after completion of payment. In some embodiments, transaction computer system 130 receives the customer's tip submission via interactive receipt 404 and communicates the amount to financial system 120. Financial system 120 adds the tip amount to the already authorized payment amount and sends the updated authorization to POS system 110 of the merchant, without requiring any additional payment approval from the customer. The merchant does not have to physically enter and request for an additional authorization for the tip amount from the financial system 120.

In some embodiment, tipping component 420 includes automatically generated tip amounts based on a payment amount associated with the transaction (e.g., 10%, 15%, or 20%). In some embodiments, tipping component 420 includes a text box that allows the customer to enter a number. In some embodiments, where interactive digital receipt 404 is in the form of a text message, tipping component 420 is embodied in a text message prompting the customer to reply with an amount (e.g., "Tip by reply with dollar amount"). In some embodiments, tipping component 420 is a Uniform Resource Locator (URL) link which takes the user to a web page to allow adding of the tip amount. The link can be a part of a text message, a part of the text box within a mobile app, or an email.

In some embodiments, tipping component 420 is configured to be available for an unlimited time period. In some embodiments, tipping component 420 is configured to be available for a predefined time period, or timeframe, starting after a time instance when payment has been authorized and approved. The time period may be, for example, an hour, a day, a week, or any other desired time period (e.g., unlimited). In some embodiments, the time period is configured by the merchant. The time period is initialized, or started, at a time instance at which the transaction between the customer and merchant has completed, and decreases incrementally, from this time instance, at a rate that corresponds to an ordinary passage of time. At the expiration of the time period (i.e., the countdown reaches 0), the tipping feature becomes unavailable. In a real-world setting, such time limitation helps the merchant manage its financial transactions more efficiently. For example, a merchant often processes its financial transactions in batches and would not want to keep any particular transaction open indefinitely.

In some embodiments, the time period of the tipping component 420 is configured to incorporate a user defined default tip amount. A customer defines a nominal tip to be automatically submitted if no tip is submitted at the time period expiration. For example, customer defines the default tip to be $10 for her favorite restaurant to make sure that merchant always gets a tip. In such example, the $10 tip is automatically authorized for any transaction with that restaurant whenever no tip amount is added at the expiration. In some embodiments, the default tip amount may be defined by the merchant. For example, a restaurant merchant may want to configure a default nominal amount for restaurant services to groups of six parties or more. In such example, when no tip is added to the payment amount at the end of a time period (e.g., 2 hours), an automatic 20% tip is added to the customer's payment card authorization.

Interactive feedback component 430 (or, "feedback component") allows the customer to submit feedback after the completion of a particular transaction with a merchant. The feedback may include submitting, for example, a rating (e.g., 5 stars), a review, a suggestion, or the like, on various aspects of the transaction (e.g., store cleanliness, service, products, overall visit satisfaction, etc.). In some embodiments, the feedback is submitted directly to the merchant. In some embodiments, a digital receipt system, coupled to transaction computer system, coordinates, communicates, and links with third party services associated with the merchant in implementing the feedback feature. In such embodiments, the digital receipt system transmits the feedback, submitted by the customer via receipt 404, to the third party services. The third party services aggregate the feedback in association with other feedback provided by the merchant. Such third party services may include, for example, Yelp.com, Urban Spoon, YP.com, and the like.

In some embodiments, feedback component 430 is configured to be available only for a predefined time period, or timeframe. In some embodiments, the time period associated with the feedback component 430 ("feedback time period") is configured to be the same as the time period associated with tipping component 420 ("tipping time period"). For example, the time periods for both may be set at one hour and at the expiration of the hour, both the tipping and the feedback features become unavailable. In some embodiments, the feedback time period is configured to be different from the tipping time period. For example, the feedback time period may be set at one week while the tipping time period may be set at one hour.

In some embodiments, the feedback time period is configured differently depending on a particular merchant. For example, merchant A configures the feedback time period to be one day while merchant B configures the time period to be one week. In such example, feedback component becomes unavailable to the customer only on the receipt generated for merchant A, and the feedback component on the receipt generated for merchant B remains active until the end of the week. In some embodiments, a merchant can configure the feedback time period to be tied to an incentive (i.e., "feedback reward") to encourage feedback. For example, the customer is rewarded a "20% Off Coupon" incentive, or feedback reward, if a written review is submitted before expiration of the feedback time period. In another example, if the feedback is submitted within 10 minutes after the completion of the payment transaction, the reward is a 20% Off coupon; on the other hand, if the feedback is submitted within 12 hours, but not exceeding the transaction time period allowed for the feedback (e.g., 24 hours), the reward is a 5% coupon.

Interactive promotion component 440 (or, "promotion component") allows a particular merchant to engage and incentivize a customer to interact with the merchant. In some embodiments, promotion component generates one or more promotional rewards (or, "promotion") associated with the completed transaction. For example, merchant A provides a coupon that can be redeemed at merchant B, an affiliated business with merchant A. In some embodiments, the promotion is time-based, where the customer must redeem the reward within a predefined period, or timeframe. In such embodiments, the promotion is configured to reduce, or decrease in value, corresponding to a decrease in the passage of time associated with the time period. The time period associated with the promotion component 440 ("promotion time period") may be configured to be the same as, or different from, the feedback time period, and/or the tipping time period.

In one example, a "$10 off" coupon is generated via the interactive digital receipt for the customer to redeem at a next meal with the merchant. Such $10 coupon is set to decrease in value (i.e., until $0) from the moment the coupon is generated subsequent to the transaction at the merchant's store. As such, the sooner the customer redeems the time-based coupon, the higher the value she receives. In some embodiments, the merchant configures the rate of reduction. In one example, the restaurant sets the $10 coupon to expire after a week, with no reduction in value as long as the coupon is redeemed. In another example, the restaurant sets the $10 coupon to expire after 3 days, where the value reduces each day until the value reaches $0 at the end of the third day.

In some embodiments, the customer redeems the promotion by completing various redemption, or promotional, activities. Details of the activities may be displayed in the promotion component 440. Some redemption activities include simply revisiting the merchant to make another purchase for goods and/or services, as discussed in the example above. Other redemption activities include participating in a game via the computing device 400B. Some redemption activities include participating in activities with other affiliated merchants. The redemption activity and the decreasing rate of the time-based reward may be configured by the merchant offering the reward. Such configurations are beneficial as they allow the merchant to customize the promotions according to the merchant's business, such as tailoring to an advertising campaign or a targeted customer demographic.

In some embodiments, promotion component 440 operates as an advertisement component to promote products and/or services. Such advertisement includes, for example, a promotional reward to entice the user to "click-on" or select a particular offering being displayed. In another example, the advertisement includes a plain display with no interaction required from the customer, where the interaction comes from the advertisement content changing to attract the customer's attention. The advertisement content can change based on the completed transaction for which the receipt 404 has been generated. For example, for a coffee purchase transaction, the advertisement includes information about a sustainable coffee alliance organization. The advertisement can also include information about nearby merchants associated with the venue where the completed transaction has taken place. In some embodiments, the interactive advertisement component is coupled to the interactive transaction record, where advertisement content is changed based on details extracted from the interactive transaction record.

Interactive loyalty rewards component 450 (or, "loyalty record component") allows the customer to maintain and manage loyalty points associated with a particular merchant. Some merchants, for example, choose to reward loyal customers with reward points for their purchases and/or services transacted with the merchant. Loyalty record component 450 tracks those purchases and/or services over time, stores and updates reward points associated with the purchases and/or services, and maintains a membership status of the customer in relation to a particular merchant. In some embodiments, the loyalty record component is configured to be time-based, where the component tracks and maintains the loyalty status and/or rewards based on a predefined time period. For example, the loyalty record component upgrades the loyalty status of the consumer every month, where it calculates the transactions completed by the consumer within the month. The time period associated with the loyalty record component 450 ("loyalty time period") may be configured to be the same as, or different from, time periods associated with other interactive components of the interactive receipt.

In an illustrative example, the rewards record tracks the number of baked goods bought from merchant A's bakery and updates the customer to an "elite status" in relation to that bakery when the customer has bought 10 items within 5 days. The elite status is displayed in the loyalty record component 450. The customer can redeem for a reward at the bakery with the loyalty record. In some embodiments, the merchant's POS system can communicate with the loyalty record component 450 without need for the customer to physically show the loyalty record at time of redemption.

Interactive transaction records component 460 ("transaction records component"). Transaction records component 460 includes one or more interactive digital receipts that has resulted from one or more financial transactions carried out by the customer with one or more merchants. In some embodiments, transaction records component 460 is configured to include only interactive digital receipts associated with a particular merchant. In some embodiments, transaction records component 460 is configured to include all interactive digital receipts associated with the customer, including receipts associated with different merchants with whom the customer has transacted. The interactive transaction record allows the customer to organize her interactive digital receipts, to maintain a comprehensive view of all payment transactions, and to perform one or more actions associated with those transactions via respective interactive components of the receipts. Other interactive components not discussed above, but consistent with the techniques discussed throughout, may also be envisioned by one of ordinary skill in the art based on the disclosed technology.

Interactive payment accounts component 470 (or, "payment accounts component") allows the customer to maintain and change payment accounts, or financial accounts, associated with a particular financial transaction in which a payment object (e.g., proxy card) is utilized. The payment accounts component allows a customer to review details about the transaction, including the payment accounts that are associated with the consumer's payment object and the particular payment account selected for payment in a particular transaction. In some embodiments, the payment accounts component allows the consumer to change the selected payment account to another payment account associated with the payment object. For example, the consumer, after leaving the merchant's place of business, remembers she has unused credits in a gift card, and accesses the payment accounts component to select the gift card, instead of a VISA credit card, to pay for the transaction. In some embodiments, the payment accounts component 470 is configured to be time-based, where the component enables the consumer to change payment accounts within a predefined time period. For example, the consumer is able to change the selected payment accounts only within one hour after the transaction has been completed (e.g., after authorization and approval). In another example, the consumer is able to change the selected payment accounts within 24 hours after the transaction.

Figure 5:
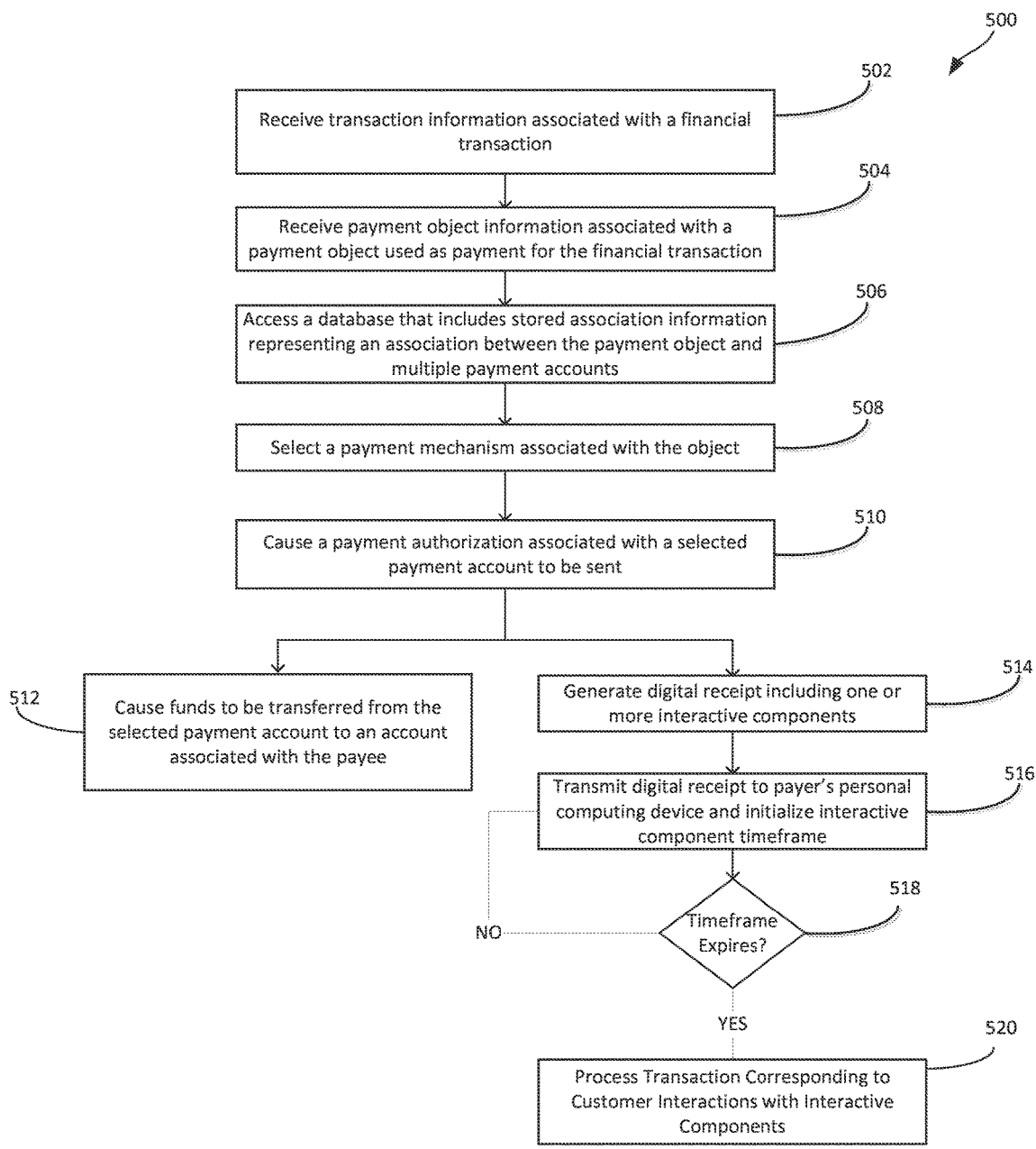
FIG. 5 illustrates a method 500 for processing a payment made using a payment object, where a digital receipt is generated upon payment authorization of a payment account associated with the payment object.

FIG. 5 is a flow chart of a method 500 for processing a payment made using a payment object, where a digital receipt is generated upon payment authorization of a payment card associated with the payment object. Method 500 may be implemented by a payment processing system, such as the one in the example of FIG. 3A. For method 500, consider a scenario where a consumer purchases a coffee from a merchant using payment object in the form of a proxy card 102. In such an example, consumer makes a payment using the proxy card by presenting the proxy card to the merchant. An object identifier associated with the merchant can obtain proxy card information from the proxy card. The object identifier can be any of object identifier examples discussed in FIG. 2. The object identifier can send the proxy card information and the transaction information to a payment processing system, such as transaction computer system 130.

At steps 502 and 504, the computer system 130 receives transaction information and proxy card information. Transaction computer system 130 then processes the payment made using the object. At step 506, computer system 130 selects one or more of the payment accounts associated with the object to use to pay for the transaction. The algorithm that the computer system 130 uses to select the one or more payment account can make the selection based on any of various criteria, and the consumer can be given the ability to modify those criteria (e.g., via a website associated with computer system 130). For example, the algorithm can select the same payment account for all payments made using the object. In the case, consumer can be given the ability to change the payment account that is chosen. As a second example, the algorithm can select an appropriate payment account for each purchase transaction, and if desired, for each line item of the purchase transaction. For example, the algorithm might select an Exxon credit card for gas purchases, and a VISA credit card for items purchased at a grocer. If the consumer purchases gas and snacks at one store, the algorithm might, for example, select the Exxon card to pay for the gas purchase and select the VISA card to pay for the snack purchase.

At step 508, transaction computer system 130 accesses a database that includes stored association information representing an association between the payment object and multiple payment accounts. The association information can be, for example, links between the payment object and the multiple payment accounts. When the payment object is a proxy card, the consumer can, for example, enter the card number of the proxy card using a web site associated with computer system 130. The consumer can then enter the card number of a first payment card using the website. Computer system 130 then links (associates) the first payment card with the proxy card, such as by using a database.

The consumer can similarly link additional payment cards with the proxy card. The linkages in the database between the proxy card and the multiple payment accounts are association information stored in the database. The database can have further association information, such as the name of the consumer, the consumer's address, credit report information regarding the consumer, and the like. This additional information further associates the proxy card and the multiple payment accounts, as the proxy card and the payment accounts are all associated with the consumer, and are associated with each other by this common association with the customer. The database can also include additional association information.

When accessing the database, this association information can be retrieved from the database. For example, computer system 130 can use the payment object information received during step 504 as an index into the database. One of the entries in the database can be a list of payment accounts associated with the proxy card. Computer system 130 can retrieve this list of payment accounts, and can further retrieve payment account information from the database.

At step 510, transaction computer system 130 causes an authorization for the payment to be sent. As a first example, transaction computer system 130 sends the transaction information and the selected payment account information to financial system 120. The financial system can determine if the payment account has access to adequate funds to make the payment, and can authorize the payment when adequate access is available. Financial system 120 can send the authorization for the purchase to the object identifier, such as POS system 110. As a second example, transaction computer system 130 causes the authorization to be sent by sending the authorization. The authorization can be sent to the object identifier, such as POS system 110. The authorization can alternately be sent to financial system 120, which can relay the authorization to the object identifier. Transaction computer system 130 can decide the payment authorization based on information such as the consumer's credit reports or scores and the history of past payments processed by transaction computer system 130.

At step 512, transaction computer system 130 causes funds to be transferred from the payment account to an account associated with the merchant. Step 512 occurs in the scenario where the customer does not change the payment account. In such scenario, the action in step 510 of causing the payment authorization, unless prevented from taking effect, such as by canceling the payment, causes funds to be transferred from the payment account to the merchant's account.

At step 514, transaction computer system 130 generates a digital receipt indicative of the financial transaction for the customer. Steps 514-520 can occur after step 510 upon payment authorization. The digital receipt generated by computer system 130 includes one or more interactive components that allow the customer to interact with various features associated with the transaction. At step 516, computer system 130 delivers the digital receipt to the customer at a personal computing device. The device may be the device 140 of FIG. 1, device 400A of FIG. 4A, or device 400B of FIG. 4B. Upon transmission of the digital receipt to the customer's computing device, a predetermined transaction time period is initiated to specify a time period at which the customer is allowed to interact (e.g., submit inputs) with one or more interactive components via the digital receipt.

At step 518, transaction computer system 130 determines whether the time period has expired. At step 520, the transaction computer system 130 processes the transaction in accordance with one or more interactions submitted by the customer (if any) to interact with the interactive components. For example, if during the time period, the customer has submitted inputs associated with a promotional game offered via the digital receipt, transaction computer system 130 can cause a promotional reward to be generated for the customer. In another example, if during the time period, the customer has submitted feedback, transaction computer system 130 can cause the feedback to be transmitted to the merchant. In some embodiments, transaction computer system 130 causes the feedback to be transmitted to third parties that collect feedback associated with the merchant. In some embodiments, some or all of steps 514-520 are implemented by a digital receipt system coupled to the computer system 130, where the digital receipt system is a dedicated system configured to generate the digital receipt and to process the interactions associated with the interactive components.

Figure 6:
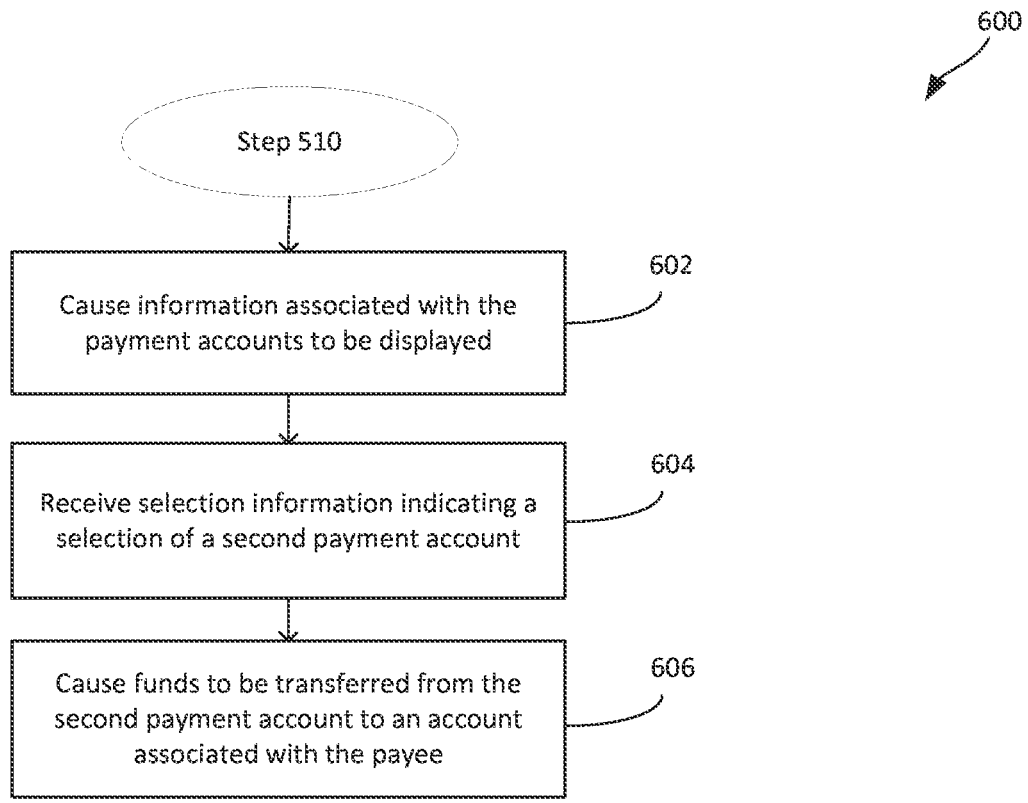
FIG. 6 illustrates a method for processing a change of payment account associated with the payment object used in a financial transaction.

FIG. 6 is a flow chart of a method 600 for processing a change of payment account associated with the payment object used in a financial transaction. Method 600 can occur after step 510 of process 500 of FIG. 5, for example. For method 600, consider a scenario after the payment transaction has been approved, when the consumer wishes to change the payment account (or financial account) used for the transaction. It is noted that the consumer only has a window of time to change the payment account. The window of time is, at most, the time period from the point in time at which authorization for a payment has been granted until the point in time at which funds actually get transferred from the financial account to an account associated with the merchant. The window of time can be configured by the banking service, the financial service, the transaction computer system, or any combination thereof, for example, by varying the latter point in time. For example, the banking service may decide to transfer funds in a batch process that is executed nightly. Alternatively, the financial service may request that funds for authorized payments be batch processed every two hours by the banking service.

In some embodiments, the consumer is able to change the payment account via an interactive component associated with an interactive receipt received at the consumer's computing device. In such embodiments, the window of time affects the time period at which the interactive component is available to the consumer. For example, a payment accounts component is offered via the receipt only within the window of time to allow the consumer to select a different payment account via the interactive receipt.

At step 602, transaction computer system 130 causes information associated with the payment accounts to be displayed. In this scenario, for example, the customer may have completed the purchase and already left the merchant's place of business with the purchased goods. Upon arriving home, the customer can decide to change the payment account to use for the payment. The customer can initiate communications with transaction computer system 130 using a computing device, such as the customer's smartphone, tablet computer, or desktop computer. In some embodiments, the transaction computer system 130 causes a window of time to display for the consumer to identify whether or not the change is possible. In some embodiments, the transaction computer system 130 does not display the window of time and merely sends a message to the consumer that change of financial account is declined in response to a change request. Transaction computer system 130 obtains the listing of payment accounts associated with the proxy object. Transaction computer system 130 sends or causes to be sent the listing of payment accounts to the customer's computing device. The customer can use the computing device to select a second payment account to use for the payment, and from which funds for the payment are to be taken, instead of the initially selected account.

At step 604, the transaction computer system 130 receives selection information indicating a selection of a second payment account by the consumer. At step 606, transaction computer system 130 causes funds to be transferred from the second payment account to the merchant's account. In particular, transaction computer system 130 sends the transaction information and the second payment account information to financial system 120. This is done to cause the funds for the payment to come from the second payment account rather than the first payment account. Financial system 120 authorizes the payment using the second payment account, and sends a payment authorization to transaction computer system 130. Transaction computer system 130 can also prevent funds for the payment from being obtained from the first payment account. For example, transaction computer system 130 sends information to financial system 120 that causes the payment and/or the payment authorization to be canceled.

Figure 7:
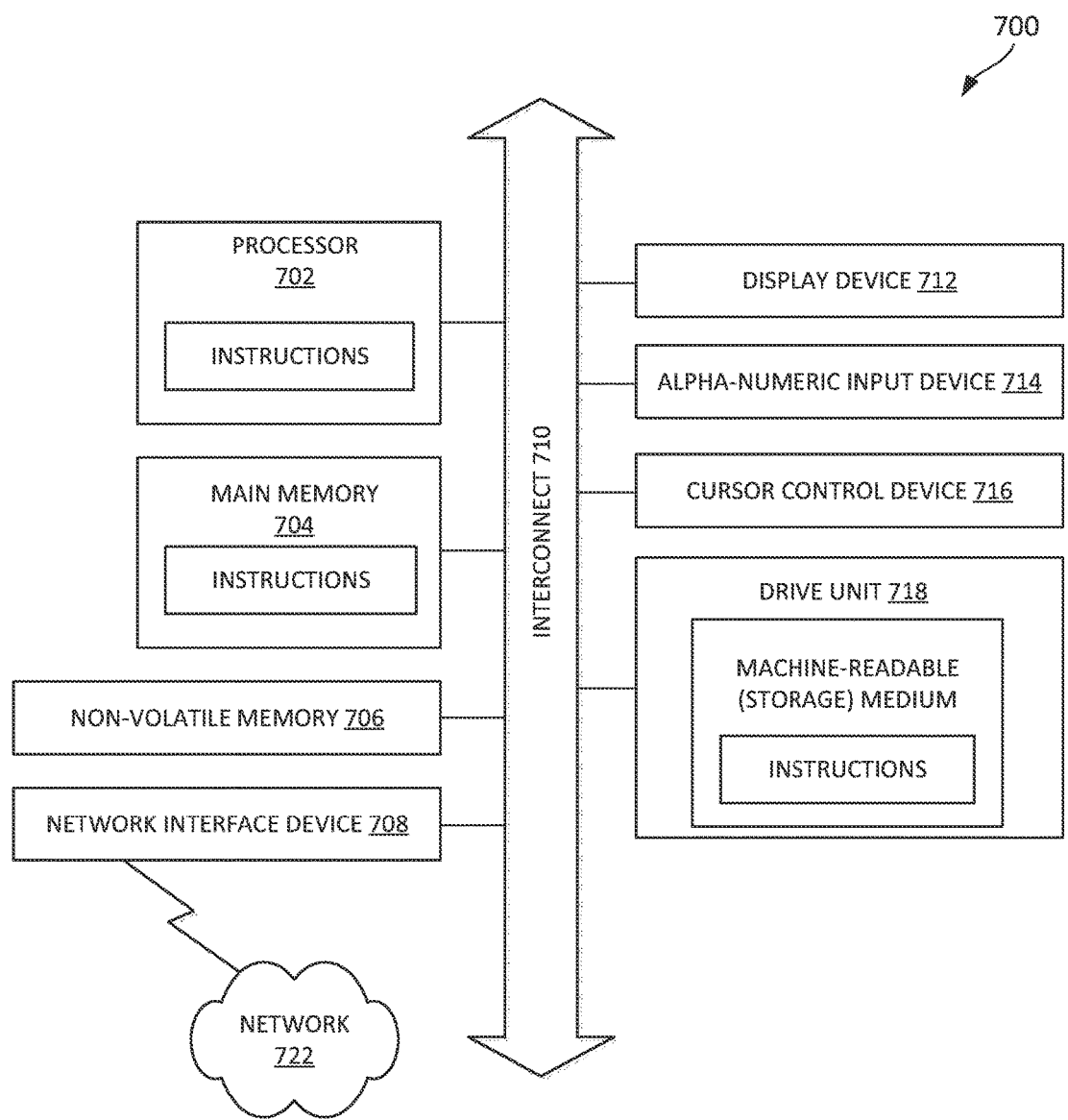
FIG. 7 is a diagrammatic representation of a computer system in which operations described herein can be executed.

FIG. 7 is a diagrammatic representation of a computer system in which operations described herein can be executed. In the example of FIG. 7, the computer system 700 includes a processor 702, memory 704, non-volatile memory 706, and an interface device 708. Various common components (e.g., cache memory) are omitted for illustrative simplicity. The computer system 700 is intended to illustrate a hardware device on which any of the components depicted in the examples of FIGS. 1-6 (and any other components described in this specification) can be implemented. In some embodiments, a given component described above may be implemented by two or more physical computer systems such as computer system 700 in FIG. 7, which may be coupled to each other via one or more networks. The computer system 700 can be of any known or convenient type. The components of the computer system 700 can be coupled together via one or more buses, bridges, adapters, point-to-point connections and/or any other known or convenient form(s) of interconnect.

The computer system 700 can take any suitable physical form. As example, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe computer, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

The processor 702 can be or include, for example, a conventional programmable microprocessor, microcontroller, application specific integrated circuit (ASIC), programmable logic device (PLD), or the like, or a combination of such devices.

The memory 704 is coupled to the processor by, for example, a bus. The memory can be or include, for example, random access memory (RAM), such as dynamic RAM (DRAM) or static RAM (SRAM). The memory can be local, remote, or distributed.

The interconnect 710 couples the processor 702 to the non-volatile memory 706 and drive unit 718. The non-volatile memory 706 can be or include, for example, a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of storage for large amounts of data. Some of this data is often written, by a direct memory access process, into memory during execution of software in the computer 700. The non-volatile storage can be local, remote, or distributed. The non-volatile memory is optional because systems can be created with all applicable data available in memory.

The interconnect 710 couples the processor 702 to the network interface device 708. The interface 708 can include one or more of a modem or network interface. A person of ordinary skill will appreciate that a modem or network interface can be considered to be part of the computer system 700. The interface 708 can include an analog modem, ISDN modem, cable modem, token ring interface, satellite transmission interface (e.g. "direct PC"), Wi-Fi interface, or other interfaces for coupling a computer system to other computer systems. The interface 708 can be coupled to one or more input and/or output devices. The I/O devices can include, by way of example, a keyboard 714, a mouse or other pointing device 716, disk drives, printers, a scanner, and other input and/or output devices, including a display device 712. The display device 712 can include, by way of example, a cathode ray tube (CRT), liquid crystal display (LCD), or some other applicable known or convenient display device. For simplicity, this disclosure assumes that controllers of any devices not depicted in the example of FIG. 7 reside in the interface.

The interconnect 710 can be or include for example, a system bus, a HyperTransport or industry standard architecture (ISA) bus, a small computer system interface (SCSI) bus, a universal serial bus (USB, USB 2.0, USB 3.0), IIC (I2C) bus, a ThunderBolt interconnect bus, a DisplayPort interconnect bus or its companion standards Mini DisplayPort (mDP), Embedded DisplayPort (eDP), Internal DisplayPort (iDP), Portable Digital Media Interface (PDMI), Wireless DisplayPort (wDP), and Mobility DisplayPort (MyDP), an HDMI interconnect bus, a DVI bus.

What is claimed is:

1. A method comprising:
   receiving, at a computer system and from a point-of-sale (POS) system associated with a payee, an indication of a financial transaction between a payer and the payee, the financial transaction involving use of a payment object associated with the payer to pay for products or services provided by the payee in the financial transaction;
   receiving, by the computer system, a notification of payment authorization of a particular payment account associated with the payment object for charging a payment associated with the financial transaction; and
   in response to the payment authorization of the particular payment account, automatically transmitting, by the computer system over a network to a computing device associated with the payer, a digital receipt indicative of the financial transaction,
   the digital receipt including a time-based interactive feedback component that enables the payer to input feedback to the time-based interactive feedback component, the feedback associated with the products or services relating to the financial transaction.

2. The method of claim 1, wherein the digital receipt is transmitted to the computing device associated with the payer for delivery to the payer at a display of the computing device.

3. The method of claim 1, wherein the digital receipt is transmitted to the computing device associated with the payer via an electronic message including any of an email address or a text message.

4. The method of claim 3, wherein the digital receipt is transmitted to the computing device associated with the payer via a mobile receipt application.

5. The method of claim 1, further comprising:
   transmitting the feedback to a third-party that aggregates a set of feedback associated with the payee.

6. The method of claim 1, further comprising:
   associating the payment object with a plurality of payment accounts; and
   causing the particular payment account to be selected from the plurality of payment accounts for charging the payment to the particular payment account.

7. The method of claim 6, wherein the plurality of payment accounts comprise any of a loyalty program account, a credit card account, a debit card account, a gift card account, or a fleet card account.

8. The method of claim 6, wherein the particular payment account is selected from the plurality of payment accounts based on a transaction item of the financial transaction.

9. The method of claim 6, wherein the digital receipt further includes a payment accounts component that allows the payer to input a user selection to change the particular payment account selected to another payment account associated with the payment object.

10. The method of claim 1, wherein the digital receipt further includes an interactive tipping component that allows the payer to input a tip amount associated with the financial transaction within a specified time period.

11. The method of claim 10, further comprising:
receiving the tip amount input by the payer within the specified time period; and
causing funds to be transferred from the particular payment account associated with the payment object to an account associated with the payee, wherein the funds is based on the tip amount input.

12. The method of claim 1, further comprising:
causing, based on the financial transaction being charged to the particular payment account, funds to be transferred from the particular payment account associated with the payment object to an account associated with the payee.

13. The method of claim 1, wherein the payment object is a payment card.

14. The method of claim 1, wherein the payment object is a biometrically identifiable object.

15. A method comprising:
receiving, at a computer system and from a POS system associated with a merchant, transaction information of a payment transaction between the merchant and a consumer, the payment transaction involving use of a payment card associated with the consumer at the POS system;
receiving, by the computer system, a notification of payment authorization of a particular payment account associated with the payment card for charging a payment associated with the financial transaction;
based on the payment authorization of the particular payment account, generating, by the computer system on behalf of the POS system, a digital receipt indicative of the payment transaction; and
transmitting automatically, by the computer system over a network, the digital receipt to an account associated with the consumer for viewing at a computing device associated with the consumer, the digital receipt including:
a time-based interactive feedback component that prompts and enables the consumer to input, via the computing device, feedback for the payment transaction.

16. The method of claim 15, further comprising:
transmitting, by the computer system and to a third-party aggregator, the feedback for the payment transaction, wherein the third-party aggregator aggregates other feedback provided for the merchant with the feedback for the payment transaction.

17. The method of claim 15, wherein the account is associated with any of an email address, a phone number, or a mobile application.

18. The method of claim 15, further comprising:
associating the payment card with a plurality of payment accounts; and
causing the particular payment account to be selected from the plurality of payment accounts for charging the payment to the particular payment account.

19. The method of claim 18,
wherein the plurality of payment accounts comprise any of a loyalty program account, a credit card account, a debit card account, a gift card account, or a fleet card account; and
wherein the particular payment account is selected from the plurality of payment accounts based on a transaction item of the financial transaction.

20. A system comprising:
a communication device through which to communicate with remote devices;
a processor coupled to the communication device; and
a memory coupled to the processor, the memory storing instructions which when executed by the processor cause the system to perform operations including:
receiving, from a point-of-sale (POS) system associated with a payee, an indication of a financial transaction between a payer and the payee, the financial transaction involving use of a payment object associated with the payer to pay for at least one of products or services provided by the payee in the financial transaction;
receiving a notification of payment authorization of a particular payment account associated with the payment object for charging a payment associated with the financial transaction;
in response to the payment authorization of the particular payment account, generating a digital receipt indicative of the financial transaction;
transmitting automatically, over a computer network, the digital receipt to an account associated with the payer for viewing at a computing device associated with the payer, the digital receipt including a time-based interactive feedback component that allows the consumer to input, to the time-based interactive feedback component via the computing device, feedback associated with the at least one of the products or services relating to the payment transaction; and
transmitting automatically, over the computer network, the feedback input by the consumer to any of the payee or a third-party aggregator that aggregates a set of feedback associated with the payee.

* * * * *